United States Patent
Gooden

(10) Patent No.: US 9,775,304 B2
(45) Date of Patent: *Oct. 3, 2017

(54) MODULAR CELL AND MATRIX FOR SUPPORTING A LOAD BEARING FEATURE

(71) Applicant: STRATA INNOVATIONS PTY LIMITED, Singleton, New South Wales (AU)

(72) Inventor: Benjamin Douglas Gooden, Singleton (AU)

(73) Assignee: Strata Innovations Pty Limited, Singleton, New South Wales (AU)

( * ) Notice: Subject to any disclaimer, the term of this patent is extended or adjusted under 35 U.S.C. 154(b) by 0 days.

This patent is subject to a terminal disclaimer.

(21) Appl. No.: 15/056,626

(22) Filed: Feb. 29, 2016

(65) Prior Publication Data

US 2016/0242367 A1 Aug. 25, 2016

Related U.S. Application Data

(63) Continuation of application No. 14/744,741, filed on Jun. 19, 2015, now Pat. No. 9,303,365, which is a
(Continued)

(30) Foreign Application Priority Data

Apr. 4, 2013 (AU) ................... 2013901153
Jul. 5, 2013 (AU) ................... 2013902491
Aug. 9, 2013 (AU) ................... 2013903002

(51) Int. Cl.
*E01C 3/00* (2006.01)
*E01C 9/00* (2006.01)
(Continued)

(52) U.S. Cl.
CPC ....... *A01G 13/0237* (2013.01); *A01G 27/006* (2013.01); *E01C 3/006* (2013.01);
(Continued)

(58) Field of Classification Search
CPC ........ E01C 11/18; E01C 11/226; E01C 19/43; E01C 5/001; E01C 6/003; E01C 9/005;
(Continued)

(56) References Cited

U.S. PATENT DOCUMENTS

| 660,540 | A | | 10/1900 | Dunne |
| 2,375,454 | A | * | 5/1945 | Wichert ................. E01C 9/083 |
| | | | | 404/36 |

(Continued)

FOREIGN PATENT DOCUMENTS

| CA | 2 552 348 A1 | 8/2005 |
| CA | 2 662 129 A1 | 3/2008 |

(Continued)

OTHER PUBLICATIONS

Greenleaf, "Urban tree and landscape products catalogue," 2002, 23 pages.
(Continued)

*Primary Examiner* — Abigail A Risic
(74) *Attorney, Agent, or Firm* — William H. Honaker; Dickinson Wright PLLC

(57) ABSTRACT

A modular cell that may be used with other cells to form a matrix under a load bearing feature, the cell being a single piece molding that supports a compressive load placed thereon, the molding including a void space defined within: a skirt shaped support member defining a substantially planar surface with an opening therein; and at least one leg integral to and extending from the support member. The cell further includes at least one separate linking member that releasably links together multiple cells to form a matrix of
(Continued)

cells. The cells may be linked together vertically and/or horizontally. The cell and matrix include greater load bearing capacity and rigidity through aligned legs to carry the weight as well as interlinking members that act to share the load among the various cells. The design also requires less material hence is cheaper to produce. The void space is also easily accessed hence allowing for easy access, filling and laying of utility lines where needed.

39 Claims, 15 Drawing Sheets

Related U.S. Application Data continuation of application No. PCT/AU2014/000356, filed on Apr. 4, 2014.

(51) Int. Cl.
  *A01G 27/00*  (2006.01)
  *A01G 13/02*  (2006.01)
  *E01C 5/00*  (2006.01)
  *E01C 23/00*  (2006.01)

(52) U.S. Cl.
  CPC .............. *E01C 5/001* (2013.01); *E01C 9/005* (2013.01); *E01C 23/00* (2013.01); *E01C 2201/00* (2013.01); *E01C 2201/20* (2013.01); *E01C 2201/207* (2013.01)

(58) Field of Classification Search
  CPC ................ E01C 23/00; E01C 2201/00; E01C 2201/207; E03F 1/002; E02B 11/00
  See application file for complete search history.

(56) References Cited

U.S. PATENT DOCUMENTS

| | | | |
|---|---|---|---|
| 2,602,323 A | 7/1952 | Leemhuis | |
| 2,792,164 A | 5/1957 | Cauffiel | |
| 3,802,790 A * | 4/1974 | Blackburn | E01C 7/14 264/31 |
| 4,478,901 A * | 10/1984 | Dickens | A47G 27/0212 404/36 |
| 4,880,333 A | 11/1989 | Glasser et al. | |
| 5,030,343 A | 7/1991 | Urriola | |
| 5,482,408 A | 1/1996 | Lunardi | |
| 5,848,856 A * | 12/1998 | Bohnhoff | E02B 11/00 405/36 |
| 6,428,870 B1 | 8/2002 | Bohnhoff | |
| 6,550,207 B1 | 4/2003 | Pontarolo | |
| 6,585,449 B2 * | 7/2003 | Chen | E01C 11/18 404/2 |
| 6,648,549 B1 | 11/2003 | Urriola | |
| 6,941,705 B2 | 9/2005 | Pontarolo | |
| 6,962,464 B1 * | 11/2005 | Chen | E01C 11/226 404/2 |
| 7,056,058 B2 | 6/2006 | Urriola et al. | |
| 7,080,480 B2 | 7/2006 | Urban et al. | |
| 7,160,058 B2 | 1/2007 | Burkhart | |
| 7,207,137 B2 | 4/2007 | Wagner | |
| 7,326,000 B2 | 2/2008 | Lee | |
| 7,704,011 B2 | 4/2010 | Marshall | |
| 8,065,831 B2 | 11/2011 | Ray et al. | |
| 8,267,618 B2 * | 9/2012 | Chen | E01C 3/003 404/17 |
| 8,696,241 B2 * | 4/2014 | Lee | E01C 13/083 404/36 |
| 9,085,886 B2 | 7/2015 | Urban et al. | |
| 2005/0155285 A1 | 7/2005 | Urban et al. | |
| 2008/0113161 A1 * | 5/2008 | Grimble | B27N 5/00 428/174 |
| 2008/0115413 A1 | 5/2008 | Blackmore | |
| 2008/0166182 A1 | 7/2008 | Smith et al. | |
| 2010/0260546 A1 * | 10/2010 | Blackwood | E03F 1/002 405/36 |
| 2011/0097151 A1 * | 4/2011 | Lee | E01C 13/083 405/39 |
| 2012/0141203 A1 * | 6/2012 | Gooden | A01G 13/0237 404/41 |
| 2012/0255624 A1 * | 10/2012 | Canney | E02B 11/005 137/315.01 |
| 2015/0016874 A1 * | 1/2015 | Wandkowski | E03F 1/005 403/292 |

FOREIGN PATENT DOCUMENTS

| | | |
|---|---|---|
| DE | 88 05 949 U1 | 7/1988 |
| DE | 203 02 681 U1 | 7/2003 |
| EP | 0 803 618 A2 | 10/1997 |
| EP | 0 860 550 A2 | 8/1998 |
| EP | 0 943 233 A1 | 9/1999 |
| EP | 0 943 737 A1 | 9/1999 |
| EP | 2 601 828 A1 | 6/2013 |
| FR | 2547561 A1 | 12/1984 |
| JP | 8-37945 A | 2/1996 |
| JP | 11-103676 A | 4/1999 |
| WO | 2011017766 A1 | 2/2011 |

OTHER PUBLICATIONS

Greenleaf, "Rootcell Modules—Installation instructions," 2 pages.
Greenleaf, "RootCell—Product data sheet," 1 page.
"Rootcell Module Loading Tests," University of Brighton, School of the Environment Structural Testing and Research Unit, Nov. 2005, 9 pages.

* cited by examiner

MODULAR CELL AND MATRIX FOR SUPPORTING A LOAD BEARING FEATURE

TECHNICAL FIELD

Described herein is a modular cell for supporting a load bearing feature and matrix formed from multiple cells. More specifically, a modular cell and matrix are described herein to be used under a load bearing feature such as a roadway or walkway. Each cell, and collectively a matrix of the cells, contains a void space or spaces suitable for water collection or to act as a rooting area for plants and trees.

BACKGROUND ART

A modular cell is described adapted to form a matrix of cells to support a load bearing feature such as a roadway, pavement or walkway while at the same time providing an area within the structural frame of the cell or matrix for a tree root network and/or service pipes. The cell matrix is sufficiently strong to not require filling and can instead be used as a reservoir or water collection area beneath a load bearing feature. The cell or matrix aims to accommodate the combined needs of trees, tree roots, storm water run off, roadways, pavements and walkways so that they all can co-exist in their interaction within the urban and suburban environment.

With respect to the rooting embodiment, there is a desire to introduce trees or plant matter into the landscape in order to make the urban and suburban environment more aesthetically pleasing and more conducive to good healthy living.

Nonetheless it is well recognised that plants and especially larger trees require a certain amount of space within these populated areas if they are going to develop into mature plants offering the benefits of shaded foliage, water retention, cooling, aesthetics and so forth to the surrounding area. Trees are referred to hereafter but it should be appreciated that the same analogy may be made of plants generally especially for larger plants.

For the most part, town planning has seen the planting of trees in urban and suburban areas to grow in close proximity to pavements and walkways so that the benefits of the trees can be enjoyed by those pedestrians utilising such features.

It is well recognised that for trees to successfully grow they require nutrient rich soils with the appropriate levels of moisture and sufficient drainage to allow the tree's root system to pass there through.

Alternatively, roadways, pavements, walkways and the like require a compacted and well supported soil structure to keep the positioned pavers or concrete in place thereby avoiding any structural damage to the construction and during the time of load bearing.

Hence if trees are going to be planted in urban and suburban areas around roadways, pavements and/or walkways there may be a predicament as to whether or not one needs to look after the trees and thereby provide low compact soil suitable for root growth or alternatively compact soils which provide the necessary load bearing support for the relevant roadway, pavement and/or walkway which, as noted above, would make it unconducive for the root system of the tree to develop.

More efficient water usage and storage is also a pressing issue in dry seasons or in dry climates yet water run off may often be lost through failure to capture rain and the like.

There are also increasing environmental standards requiring the capture of pollutant run off from hard surfaces.

There also needs to be sufficient area available for utilities such as piping and wiring to pass through the ground or other structures.

One solution described in PCT/AU2010/001034 is a modular cell adapted to form a structural frame of cells for supporting a load bearing feature while at the same time providing an area within the structural frame for a tree root network and/or service pipes. This design represented a major improvement on the art especially in terms of strength and load bearing capacity. One difficulty though was that the legs of this design alternated in position hence there was not a single continuous load bearing member when multiple cells were stacked vertically. A further difficulty was that the opening at the top of the modular cell was limited in size and made it difficult to ensure soil transfer through the opening and into all void spaces in the cell. In addition the walls of the cell could cause segmentation with water not flowing to all void spaces and the cell walls could also restrict access for larger service pipes to pass through the cells.

It should be appreciated that it would be useful to provide a modular cell and matrix using the cells which is able to accommodate the needs of both trees and utility lines and/or water collection and utility lines, as well as meeting the physical engineering requirements of supporting a load bearing feature, or at least to provide the public with a choice.

Further aspects and advantages of the modular cell and matrix will become apparent from the ensuing description that is given by way of example only.

SUMMARY

Described herein is a modular cell and matrix formed using multiple cells for supporting a load bearing feature. A matrix formed using the cells is sufficiently strong to hold a load without filling of the cell void spaces hence may be used as a reservoir space or instead, may be filled with soil and the void space in the cells used to form a rooting area underneath the load bearing feature.

In a first aspect, there is provided a modular cell adapted for use with other cells to form a matrix under a load bearing feature, the cell being a single piece moulding that supports a compressive load placed thereon, the moulding including a void space defined by:
(a) a skirt shaped support member defining a substantially planar surface with an opening therein; and
(b) at least one leg integral to and extending from the support member; and
wherein the cell is suitable to receive a separate linking member or members to releasably link together multiple cells to form a matrix of cells in both a vertical and a horizontal plane.

In a second aspect, there is provided a matrix under a load bearing feature, the matrix being made up of a plurality of modular cells substantially as described above wherein the cells are linked together vertically and/or horizontally.

In a third aspect, there is provided a method of forming a load bearing matrix using the cell substantially as described above, the method including the steps of:
(a) excavating a pit area into which the matrix will be positioned;
(b) creating a first horizontal layer of cells and interconnecting the cells using the linking member or members;
(c) placing at least one further layer of cells onto the first layer, aligning the leg or legs of each cell such that an applied load is transferred continuously down through the legs of the matrix structure and interconnecting the cells using the linking member or members; and (d) placing a load bearing feature over the matrix.

In a fourth aspect, there is provided a method of forming a load bearing matrix using the cell substantially as described above, the method including the steps of:

(a) excavating a pit area into which the matrix will be positioned;

(b) creating a first vertical layer of cells and interconnecting the cells using the linking member or members;

(c) placing at least one further layer of cells alongside the first layer, aligning the leg or legs of each cell such that an applied load is transferred continuously down through the legs of the matrix structure and interconnecting the cells using the linking member or members; and (d) placing a load bearing feature over the matrix.

Advantages of the above described modular cell and matrix include greater load bearing capacity and rigidity through aligned legs to carry the weight as well as interlinking members that act to share the load among the various cells. The design also requires less material hence is cheaper to produce. The void space is also easily accessed hence allowing for easy access, filling and laying of utility lines where needed.

BRIEF DESCRIPTION OF THE DRAWINGS

Further aspects of the modular cell and matrix will become apparent from the following description that is given by way of example only and with reference to the accompanying drawings in which.

DETAILED DESCRIPTION

Figure 1:
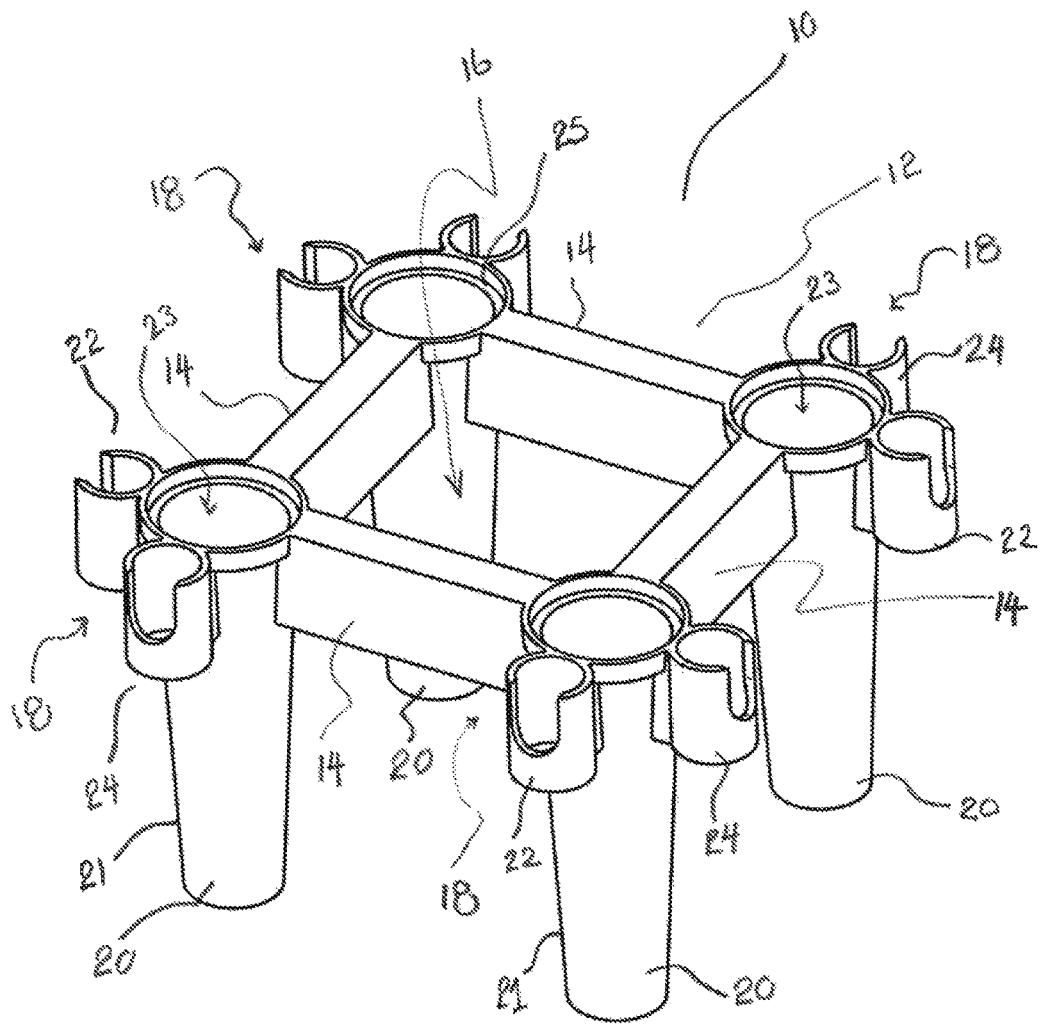
FIG. 1 illustrates a perspective view of the modular cell without the separate linking members.

As noted above, described herein is a modular cell and matrix formed using multiple cells for supporting a load bearing feature. A matrix formed using the cells is sufficiently strong to hold a load without filling of the cell void spaces hence may be used as a reservoir space or instead, may be filled with soil and the void space in the cells used to form a rooting area underneath the load bearing feature.

For the purposes of this specification, the term 'about' or 'approximately' and grammatical variations thereof mean a quantity, level, degree, value, number, frequency, percentage, dimension, size, amount, weight or length that varies by as much as 30, 25, 20, 15, 10, 9, 8, 7, 6, 5, 4, 3, 2, or 1% to a reference quantity, level, degree, value, number, frequency, percentage, dimension, size, amount, weight or length.

The term 'substantially' or grammatical variations thereof refers to at least about 50%, for example 75%, 85%, 95% or 98%.

The term 'comprise' and grammatical variations thereof shall have an inclusive meaning—i.e. that it will be taken to mean an inclusion of not only the listed components it directly references, but also other non-specified components or elements.

The term 'load bearing feature' and grammatical variations thereof refers to roadways, pavements and walkways or other features on which a load such as a vehicle or structure may be applied.

The term 'tooless' or grammatical variations thereof refers to a mechanism that does not require a separate tool to operate the mechanism.

The terms 'upper' and 'lower' when used refers to the orientation of the cell when in situ i.e. legs facing towards the bottom of the pit, the leg endings being the lower portion of the cell in situ and the support member facing towards the load bearing feature, being the upper portion of the cell in situ.

In a first aspect, there is provided a modular cell adapted for use with other cells to form a matrix under a load bearing feature, the cell being a single piece moulding that supports a compressive load placed thereon, the moulding including a void space defined by:

(a) a skirt shaped support member defining a substantially planar surface with an opening therein; and (b) at least one leg integral to and extending from the support member; and wherein the cell is suitable to receive a separate linking member or members to releasably link together multiple cells to form a matrix of cells in both a vertical and a horizontal plane.

The support member shape may be a circular or semicircular skirt. The skirt may be polygon shaped. In one embodiment, the skirt may be substantially rectilinear polygonal shaped.

Multiple cells may be linked together via the linking member or members toolessly and without the need to use separate fasteners. As may be appreciated, this speeds assembly and avoids the added expense of labour and materials attributable to fasteners or tool use. Tooless assembly also keeps the assembly process simple and requires minimal skill to assemble.

When multiple cells are stacked vertically, the leg or legs of each cell may substantially align vertically such that an applied compressive load from a hard surface is transferred continuously through the legs of the matrix structure to a surface on which the matrix is placed. This design overcomes some of the drawbacks of art designs by offering a continuous load structure (the cell leg or legs).

The above design has a compression strength when in matrix format to withstand the weight of a load bearing feature (and any load on that feature) without needing to be filled or reinforced by other materials such as soil. The compression strength of the cell may be greater than at least approximately 200 kPa. As may be appreciated, this compression strength may be equal to or greater than is typical for art cell designs. The cell strength may be greater than or equal to approximately 300 kPa. The matrix strength incorporating the cells may be higher again—as may be appreciated, when the cells are linked together as a matrix, the cells share an applied load and therefore have a greater strength than one cell used alone.

The cell may be manufactured from plastic. The cell may be manufactured from recycled plastic. The cell may be further strengthened by the addition of glass fibres into the plastic. In the inventor's experience, introduction of glass fibres can double the compressive strength of the cell versus a non-glass fibre cell. As may be appreciated, use of glass fibres may be optional and only for high loading applications.

The above design further meets various loading standards without needing to choose specific soil fill type(s). The strength of some art cells may be dependent on the aggregate profile used to fill the cells and this aggregate profile is critical as the art cell structure itself may offer little strength. The cell structure described herein is strong enough to not need any fill at all and support a load, or at least does not require the same care and attention of aggregate profile selection as what some art cells may require. As may be appreciated, the ability to avoid so much care in aggregate selection means the cell described herein may be more versatile than the art as a range of soil/aggregate types may be used or, even no soil fill may be a useful embodiment for example, where the cells are used to form a void space used as a reservoir.

A further advantage of the above design is that it may be possible to minimise, or avoid altogether, compaction of soil used in the cell matrix yet still achieve desired strength unlike art cells that may require at least some compaction to gain the desired level of compression strength (up to 80% compaction).

Each cell may have a void space of at least approximately 80% of the cell volume. Each cell may have an unsegmented void space of at least approximately 80%. In one embodiment, the void space or space available for water storage or rooting space may be at least 85%. As may be appreciated, greater void space means more volume is available for rooting and/or liquid collection. Also important when considering void space is segmentation—some designs can have considerable void space but that space is not available for rooting or for liquid storage. The above described cell has all of the described void space available and free of segmentation.

As noted above, the void space within the cell or cells may be filled with soil and used to support a rooting area within the matrix. This is a typical application of such cells and the above described cell is particularly useful for this owing to little segmentation of the void space within the cell whilst also improving load bearing strength.

The above described open void structure leads to easy flow of water throughout the structure thereby avoiding dry regions or segments within the cells.

A further advantage of the above design is that the cells, when in matrix form, are easy to fill with soil since each cell support member has a sizable opening sufficient to allow easy tipping of soil into the void space and the opening is continuous through to the bottom of the excavated area in which the cells are placed. Also, since there is a continuous view through the openings to the base of the matrix, it is possible to, from a viewpoint above a constructed matrix, visually inspect the bottom of a matrix for construction or inspection purposes, and observe that filling occurs in all void spaces.

As noted above, there is no need to specify any particular type of soil. The above cell design handles a range of soil types and unlike art designs, there is no need for specifying for example, use of sandy dry soils. It is envisaged that a range of soils may be added to the cells without difficulty including but not limited to loams (unscreened), moist soils, bio-retention soils and existing site soils. There is also no need to vibrate the soil into the matrix voids although this could be completed if desired.

In a further embodiment, the soil fill may instead be a filtration media. For example, the filtration media may be activated charcoal, zeolite or other highly porous transfer medium. It is envisaged that the cell filled with such filtration media may be used to remove contaminants from incoming liquid thereby acting as a filter. Once example of this embodiment may be under or around milking sheds to catch liquid run off and the filter such run off prior to further treatments. Another example may be to use this filter embodiment around vehicle washing stations and treat or part treat water run off from such stations.

The actual area available for root growth may be substantially all of the full void volume. This is because there are no anticipated dry areas or areas that might not be filled with soil such as segmented regions.

As noted above, the void space within the cell or cells may alternatively be used as a reservoir. This form of application is only possible due to the high compressive strength attained using the above described design. Reservoir applications may be to capture water in general, stormwater run off, grey water or to capture pollutants or polluted water from entering waterways such as rivers. In such reservoir embodiments, the pit in which the matrix is formed may be lined so as to prevent egress of water from the reservoir volume. The reservoir may be designed so as to capture all run off. The reservoir may instead be designed so as to capture and directionally release the liquid—for example, water collected may be released in a trickle manner via tubing directing the liquid flow to plants neighbouring the cell matrix site. The reservoir may also be used as part of a flood control management strategy.

The void space within the cell or cells may be empty. In this embodiment, the internal walls of the pit into which the cell or cells are placed may be lined and for example used as described above to collect rainwater therein.

At least one utility line may pass through the void space in the cell or matrix of cells. Utility lines often pass through growing spaces and art products have had varying success in allowing easy access for utility lines. The above described cell has continuous spaces for easy utility line access and placement. Utility lines include piping for stormwater management, sewerage management and water. Utility lines may also encompass wiring such as electrical wiring, phone wiring and so on—such wires may be inside piping such as conduit piping.

The size of utility lines able to pass through the above described cells may be significantly larger than art designs. By way of example, utilities greater than or equal to approximately 5 inches in diameter may pass through a matrix made using the above described cells. In selected embodiments, utility lines may be up to 200 mm in diameter. The open framework described gives flexibility and allows for both straight and flexible utility lines.

The overall cell size may be varied to suit the desired application but, by way of illustration, may be 300, or 400, or 500, or 600, or 700, or 800, or 900, or 1000 mm in width from side to side of the planar support surface and approximately 100, or 200, or 300, or 400, or 500, or 600, or 700, or 800, or 900, or 1000 mm in height measured from the planar support surface to the distal end of a leg.

As noted above, the matrix formed using multiple cells may have continuous openings vertically and/or horizontally. This design in turn leads to either minimal or no segmentation issues and allows for a continuous rooting volume.

In one embodiment, the leg ending or endings may be shaped to complement a depression or depressions in the support member of a second cell about the interface between the support member of the second cell and the leg or legs of the first. The cells may be linked together vertically via a linking member (termed hereafter as a 'vertical linking member') inserted between the leg ending or endings of a first cell and the depression or depressions of a second cell. The depression may be in the form of a cavity. While direct linking between cells may also be completed, the above approach of using a vertical linking member may be advantageous for strength and versatility plus this allows the use of hollow legs, a useful characteristic to decrease the amount of material used to form the cells and to allow nesting of the cells during transport.

The leg or legs may have a cylindrical or semi-circular cross-sectional shape although other polygonal shapes may also be used.

The depression or depressions in the support member may correspond to an at least partially hollow core within a leg or legs. In one embodiment, the leg or legs may be completely hollow.

The leg or legs may be at least partially tapered to narrow as the leg extends from the support member. The leg or legs may taper linearly inwards from the support member distal end (greatest width) to the distal end or ends of the leg or legs (smallest width).

The vertical linking member may be a wedge adapted to engage the ending of a leg from a first cell and also engage the depression in the support member or hollow leg opening from an immediate cell situated below the first cell.

The wedge may be a circular cap adapted to frictionally fit the ending of the leg. The at least partly hollow opening of each leg (or support member depression) may include an internal collar on which the cap rests when one modular cell is vertically mounted upon another cell.

The wedge or cap may have an internal rib configuration in order to link or fixably fit the depression or leg hollow opening. Each wedge or cap may include an external shoulder adapted to rest upon the internal collar of the hollow opening of the leg of a vertically adjacent modular cell.

The wedge provides the vertical connection between vertically mounted modular cells and achieves a unique way to secure upper and lower cells in the matrix. No fasteners or tools are required to link the separate cells, with the parts simply being lightly compressed together to achieve the linkage.

The cell may include at least one mating section (termed hereafter as a 'horizontal mating section') as part of the moulding that releasably engages one distal end of a linking member (termed hereafter as a 'horizontal linking member') and wherein the opposing distal end of the horizontal linking member engages a horizontal mating section of a further cell thereby linking the cells in a horizontal plane. While the above has been described in the context of the section or member being a separate item, one or both of these parts may be integral to the support member and not separate parts.

The horizontal linking member may be an elongated rod. The elongated rod may have a main horizontal body length defining the distance of separation in a horizontal plane between adjacent modular cells. The distance of separation may be equivalent to 20, or 30, or 40, or 50, or 60, or 70, or 80, or 90, or 100, or 110, or 120, or 130, or 140, or 150% of the cell width. The distance of separation may be substantially equivalent to that of the width of a cell. Such a distance of separation may be beneficial so as to limit the number of cells required to form a matrix thereby reducing material costs to form a matrix (for example, approximately 30-50% fewer cells required than if no horizontal linking members were used).

The distal ends of the horizontal linking member may terminate with tabs. These tabs may complement and fit into the shape of the horizontal mating section(s) of the cell.

The horizontal mating section(s) may have a socket shape that receives and fixably retains the tabs of the horizontal linking member(s).

The horizontal mating section(s) may be located at two engagement points, configured at substantially right angles to each other. The two right angle engagement points may be located at each corner of the support member skirt thereby enabling modular cell construction to extend in all directions in a horizontal plane and for vertically constructed columns of modular cells to be evenly spaced in all directions. In an alternative embodiment, one engagement point may be used located about the apex of at least one corner of the support member skirt.

The use of the two engagement points configured at substantially right angles at each corner of the support member skirt provides a convenient way in which the modular cells can be joined together. As noted above, single attachment points may be used but a double engagement point means easier building of a matrix and greater structural strength for a given volume of materials used. Placement of the engagement points at right angles in conjunction with the support member shape means that the modular cell does not have to be aligned or adapted in any particular orientation as a universal fit becomes available allowing a simple and straightforward task in the construction of the structural frame both vertically and laterally. Alternative arrangements of engagement points for support members having other shapes (e.g. hexagonal) are encompassed herein as should be appreciated by the skilled person. Ultimately, engagement points may ideally be arranged such that a matrix can extended in all directions.

The modular cells can be installed with or without the horizontal linking members. When the horizontal linking members are used, the end structure is an interconnected matrix with a great deal of strength and rigidity. Also, despite using an interconnected structure, the parts are easy to separate if needed, such as when an area is excavated. The modular nature of the cells and separate linking members means that it is easy to remove a small section of the matrix or even an individual cell from the matrix. It is not necessary to remove big portions of the matrix although this too is possible if desired. Interlinking during assembly also helps to retain the cells in position during the assembly process.

The horizontal linking members may also provide tolerance to manage contour variation on a horizontal support surface. As may be appreciated, a pit into which the cells are placed may not be perfectly flat. The connecting members between cells may be sloped between cells thereby addressing height variation in cells due to uneven ground. In one embodiment, the slope of the horizontal linking member may be at least 1, or 2, or 3, or 4, or 5, or 6, or 7, or 8, or 9, or 10 degrees from a horizontal plane.

The cells may be shaped so that multiple cells may be nested together for storage and transportation. As noted above, the leg or legs may be characterised by having a substantially hollow core and tapered length—in this embodiment, the leg or legs of one cell may fit into the hollowed leg or legs of a subsequent cell and by fitting the cells together about the legs, the cells may be nested closely together in this manner. Linking members (horizontal and vertical) may be stored and/or transported separately, these parts being comparatively small. A bag of such linking members may for example be placed inside the void space of one bottom-most cell in a nested stack of cells.

In a further embodiment, vertical linking members may be fitted at the interface between the base of the legs of the cells on the bottom most layer of the matrix and the substrate on which the matrix is placed. It is envisaged that this embodiment may be useful to increase the load rating of the matrix applicable in potentially high loading applications. As should be appreciated, it is not essential to use the vertical members on the leg endings and for lower loading applications, the linking members may not be present.

A cell or cells may also optionally include a grating.

The grating may be of a suitable size to engage the opening in the top of a cell defined within the skirt shaped support member. In selected embodiments, the grating circumference is sufficiently large that, when fitted to a cell, the grating may be a snug fit into the cell opening. The grating may include a solid border region with members inside the border region defining a grating matrix or mesh pattern. The mesh pattern region may be slightly recessed into the cell opening when fitted to a cell relative to the border region of the grating. The mesh pattern members may include two thicker members that define the central intersecting members and other relatively thinner members surrounding these thicker members. The exterior of the grating border region may have an inverted L-shape, the acute angle region or interior of the L-shape conforming to the shape of the cell opening. Part of the L-shape region may extend from the solid border region of the grating to form a lip or flange that engages the edge of the cell opening and prevents the grating from falling through the cell opening. When fitted, the grating may rest approximately flush with the cell top.

The grating may include an enlarged corner so as to assist with handling the grating when placing the grating onto a cell or when removing the grating from a cell.

The walls of the L-shape interior may include rib elements to increase the strength and rigidity of the grating. The rib elements may also assist with ensuring a snug fit of the grating into the cell opening and, via friction between the grating rib elements and cell opening, prevent the grating from disengaging the cell.

When gratings are used in a matrix of cells, they may be placed on the top cell layer only and lower layers may not have the gratings.

In an alternative embodiment, the cell opening may have a recessed internal shoulder that acts to support a grating placed into the cell opening void.

An aim of the gratings may be to support particular geo-composites and/or paving. Gratings provide a greater surface area on which a substrate such as a path or road or tiles may be placed and minimise void space underneath—the result is the avoidance of localised slumping or even holes in the substrate about a cell opening void. Gratings may also give extra strength and rigidity to the cell and/or matrix plus the help to distribute compressive load across matrix and not just on single cells or single cell legs.

Use of gratings may be optional dependent on the loadings needed plus depth of matrix—for example, gratings may be more critical if the top of the cell matrix top is close to the surface.

In use, the cell gratings may be dropped or slotted into the cells prior to a substrate layer being placed over the matrix. If the cell matrix is to be used for root growth, soil may be filled into the cells and/or matrix, and the gratings fitted last.

The mesh spacing of the grating may be sized sufficient to let water pass through yet also give structural strength to dissipate load among multiple cells. The grating pattern used may be varied and/or optimised to suit minimise materials and therefore cost yet also provide sufficient strength and rigidity. It should be appreciated that a cross hatch pattern is one means for achieving this optimum but that other patterns such as a bike spoke pattern may also be used.

The gratings may be made from the same materials as the cells.

A base member may be placed between the cell or bottom layer of cells in a cell matrix and a substrate on which the cell or matrix of cells are placed.

As may be appreciated from the above description of the vertical linking members, these members may be fitted between the base of a cell leg or legs and the ground or substrate on which the cell or cells are placed. Use of individual linking members like this may be beneficial to spread the point load from a leg or legs onto the substrate and avoid localised deformation in the cell or matrix level.

Other base load distribution parts may also be used instead of the vertical linking members. The base may be a tray on which the cell or cells are placed. The base member may be formed as a single piece skirt shaped member with a central opening and wherein each leg of the cell links with an enlarged section on the base member.

The base may be a member to interlock or engages the base of one or more legs. The interlocking/engagement may be via the leg endings snugly fitting into a receiving portions on the base in the manner of a male (leg) and female (base upstand) fitting.

The base may include at least one aperture.

In one embodiment, the base is formed as a skirt shaped member with an opening therein and enlarged section in the member about the interlinking region or regions of the member that link with the leg or legs of the cell. The skirt shaped member may include four sides complementing the shape of the opening in the cell skirt.

Enlarged sections about the leg ending may be used on the base complementary to legs of a cell. The enlarged sections may be of a circular shape. The enlarged sections may have a diameter approximately 1 (the same), or 2, or 3, or 4 times larger than the diameter of the leg ending. Each enlarged section may be linked to form the skirt shaped member using elongated rods.

The base may be formed as a single piece, placed onto the substrate on which the cell or cell matrix are to be built and the cell then fitted to the base.

It is envisaged that the base may only be used on the bottom of a cell matrix however this should not be seen as limiting as the base could be inserted for example between cell layers to segregate layers in the matrix.

The base member may be manufactured from plastic and moulded into the desired shape.

An advantage of using the above base is to spread the point load (compressive downwards force from the load bearing feature) from the leg ending(s) to the ground or substrate on which the cell or cell matrix is placed. A further advantage of a base may be to minimise and/or avoid localised slumping or level variation in the cell or cell matrix due to a leg or legs depressing into the substrate. A further advantage of the base may be to provide extra rigidity to the legs of the base cell preventing them from splaying out or in relative to the normal (un-splayed) position.

In a second aspect, there is provided a matrix under a load bearing feature, the matrix being made up of a plurality of modular cells substantially as described above wherein the cells are linked together vertically and/or horizontally.

In a third aspect, there is provided a method of forming a matrix under a load bearing feature using a cell substantially as described above, the method including the steps of:
 (a) excavating a pit area into which the matrix will be positioned;
 (b) creating a first horizontal layer of cells and interconnecting the cells using the linking member or members;
 (c) placing at least one further layer of cells onto the first layer, aligning the leg or legs of each cell such that an applied load is transferred continuously down through the legs of the matrix structure and interconnecting the cells using the linking member or members; and
 (d) placing a load bearing feature over the matrix.

In a fourth aspect, there is provided a method of forming a matrix under a load bearing feature using a cell substantially as described above, the method including the steps of:
 (a) excavating a pit area into which the matrix will be positioned;
 (b) creating a first vertical layer of cells and interconnecting the cells using the linking member or members;
 (c) placing at least one further layer of cells alongside the first layer, aligning the leg or legs of each cell such that an applied load is transferred continuously down through the legs of the matrix structure and interconnecting the cells using the linking member or members; and
 (d) placing a load bearing feature over the matrix.

In the above aspects, before step (c) or step (d), the void space defined within the cell matrix may be filled with soil. More specifically, one horizontal or vertical layer may be assembled and filled with soil and then a subsequent layer placed on top or alongside the first filled layer that is then in turn filled. Alternatively, a full matrix horizontally and vertically may be assembled and then filled with soil prior to placing the load bearing feature such as a road surface on top of the matrix.

Alternatively, before step (b), the pit area may be lined and then assembly of the matrix occurs as described above. No soil or fill is placed within the matrix formed and the void space within the cells is used a reservoir space to retain for example, stormwater run off.

During steps (b) or (c) above, a utility line or lines may be placed within the cell matrix void space.

Steps (b) and (c) may be completed toolessly and do not require any special tools or fasteners to complete.

Optionally, in the above methods, after step (c) and before step (d), the top of the cell matrix may have a grating or gratings placed into the openings of the top most cells.

Advantages of the above described modular cell and matrix using the cell include greater load bearing capacity and rigidity through aligned legs to carry the weight as well as interlinking members that act to share the load among the various cells. The design also requires less material, may be assembled without tools and does not require separate fasteners to retain the matrix together hence is inexpensive and simple to produce and assemble. The void space is also easily accessed hence allowing for easy access, filling and laying of utility lines where needed.

The embodiments described above may also be said broadly to consist in the parts, elements and features referred to or indicated in the specification of the application, individually or collectively, and any or all combinations of any two or more said parts, elements or features, and where specific integers are mentioned herein which have known equivalents in the art to which the embodiments relates, such known equivalents are deemed to be incorporated herein as of individually set forth, Where specific integers are mentioned herein which have known equivalents in the art to which this invention relates, such known equivalents are deemed to be incorporated herein as if individually set forth.

WORKING EXAMPLES

The above described modular cell and matrix are now described by reference to specific examples.

Example 1

FIG. 1 shows an embodiment of the modular cell (10) including a support member being a main upper substantially rectilinear polygon shaped member shown as (12) which includes four sides (14) establishing a main support body that includes an upper opening (16).

The sides (14) of the support member (12) have at each corner, cylindrical columnar legs (20).

Each leg (20) has a hollow core shown by way of (23) and tapered side edge (21) such that when the modular cells are stacked, for example during storage and/or transportation each of the respective cylindrical columnar legs (20) can nest with the hollow core (23) of a corresponding modular cell.

Figure 2:
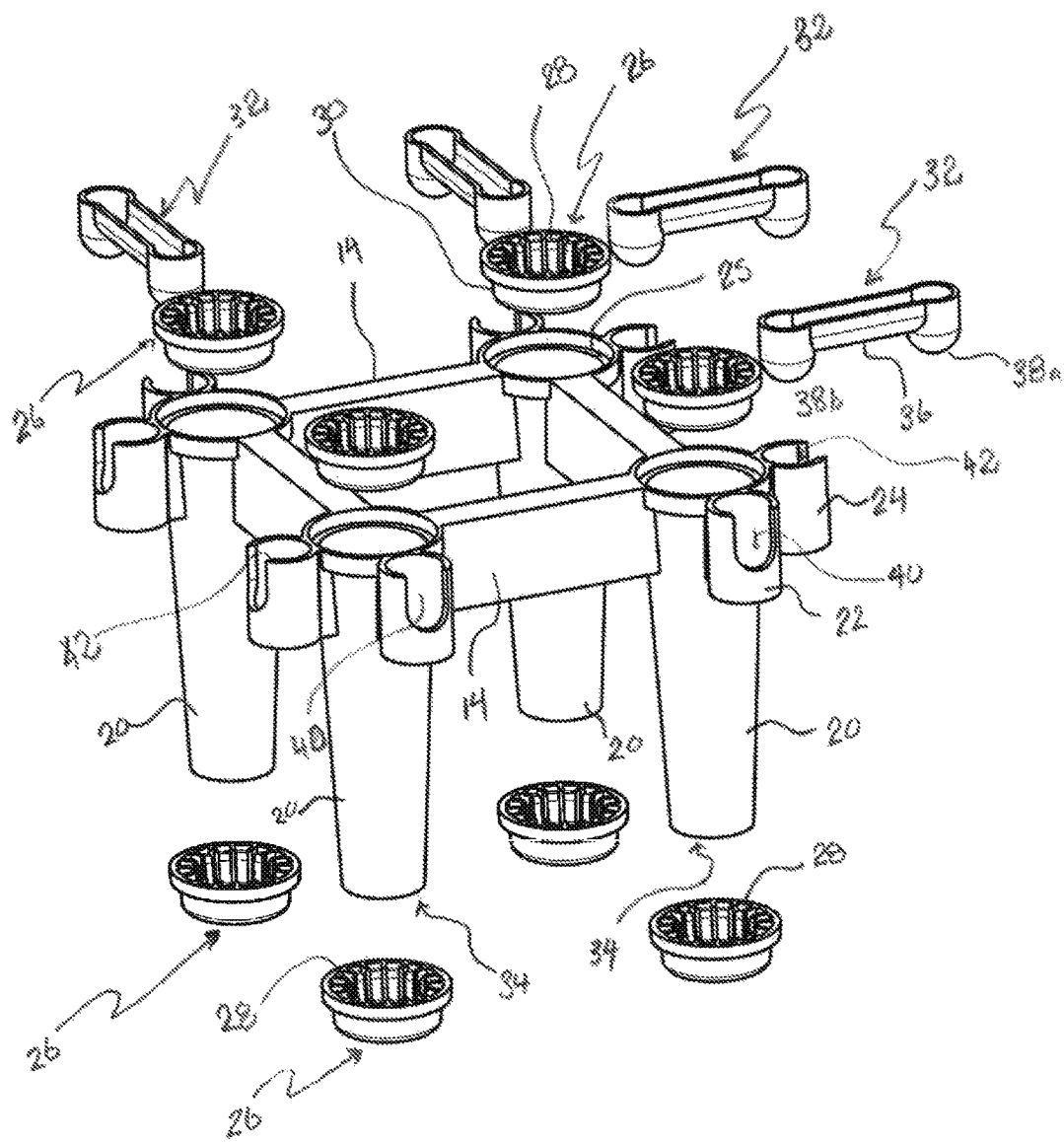
FIG. 2 illustrates a perspective view similar to the representation in FIG. 1, but also including linking members in this embodiment being caps providing a vertical linkage between cells and lateral elongated rods providing a horizontal linkage between cells.

The modular cell (10) further includes an internal collar (25) which as shown in FIG. 2 works in combination with a vertical linking member shown in this embodiment as a cap (26) to engage a peripheral end (34) of the cylindrical leg (20) of a corresponding modular cell (10) when the modular cells (10) are mounted vertically one upon the other.

Each cylindrical leg (20) includes two horizontal mating sections or engagement locations (22) and (24) substantially at right angles to each other which are illustrated in greater detail in FIG. 2. These engagement locations (22) and (24) allow for the horizontal linking member shown in this embodiment as an elongated rod (32) to engage the respective slots (40) and (42) of each of these engagement points (22) and (24) so that the modular cells (10) can be laterally engaged.

Circular caps (26) which include an internal ribbing (28) are adapted to engage the general base peripheral area (34) of each cylindrical leg (20).

This circular cap (26) on its external surface includes a shoulder (30) which is configured so as to rest and fix in place upon the internal collar (25) on the upper circular edge of a corresponding (i.e. second) modular cell (10) below the modular cell (10) which are stacked vertically one upon the other.

The introduction of the cap (26) provides secure connections between upper and lower modular cells (10). Further, with the respective cylindrical legs (20) aligned, the overall ultimate crush strength of the frame structure once constructed is increased.

Figure 3:
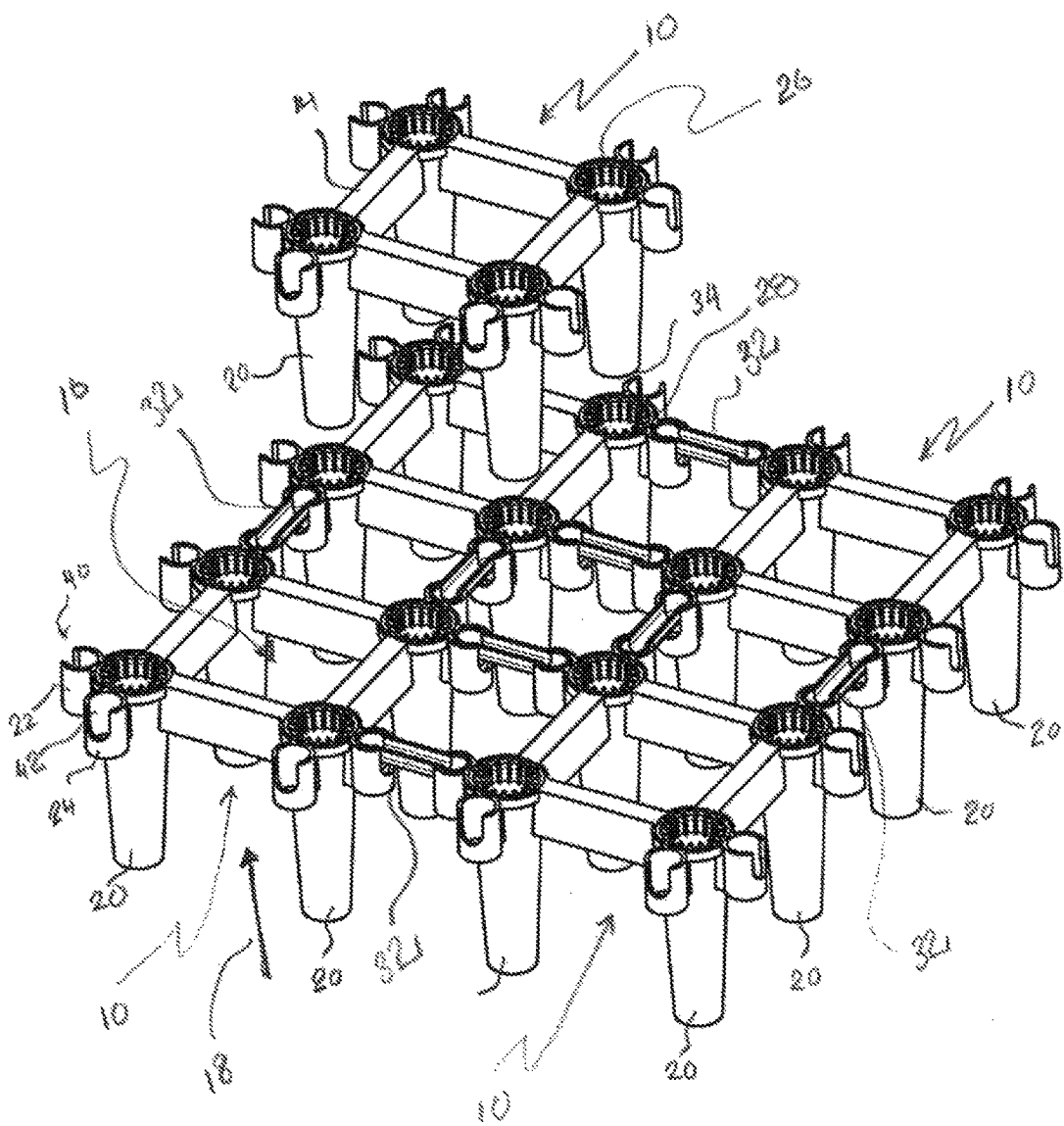
FIG. 3 illustrates a perspective view showing the modular cells laterally and vertically interconnected.
Figure 4:
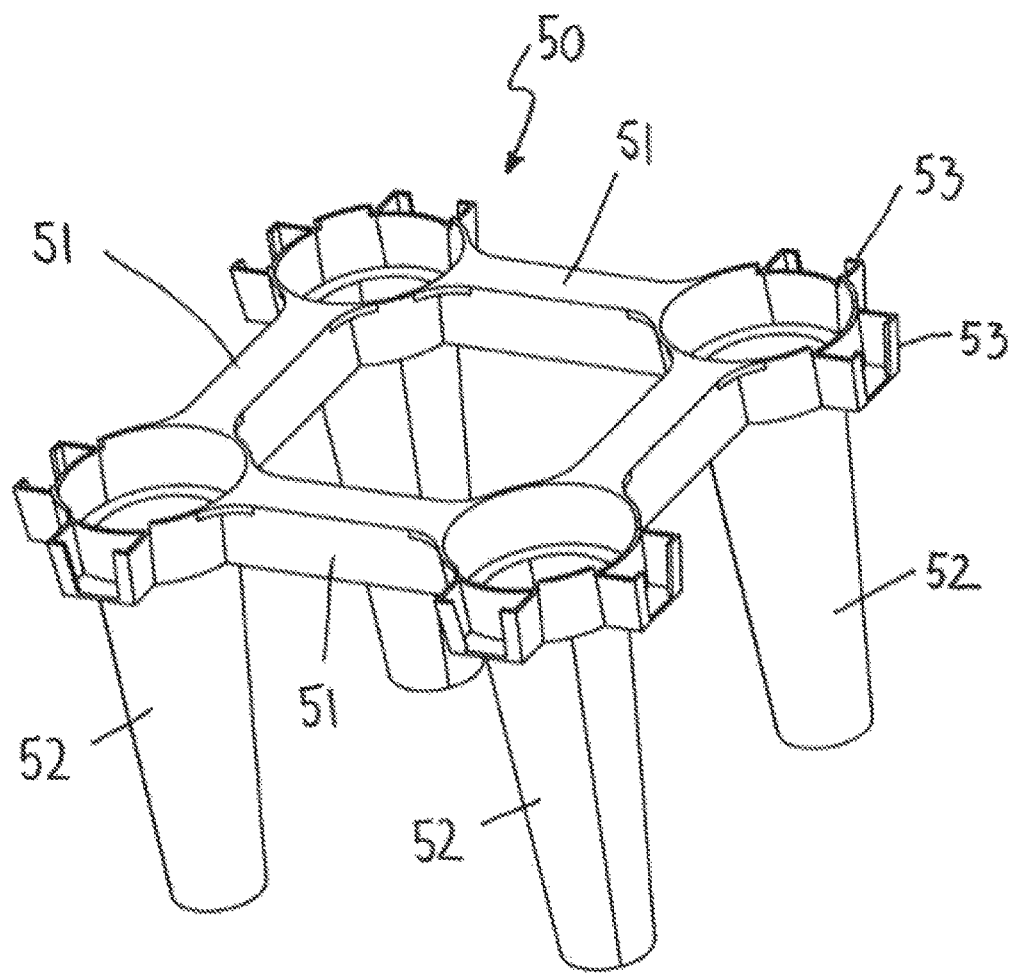
FIG. 4 illustrates a perspective view of an alternative embodiment of a modular cell with the linking members removed.

As best seen in FIG. 3, the modular cell (10) when vertically connected between upper and lower modular cells (10) has the cylindrical legs (20) aligned such that an applied load or crush load is transferred directly down through the aligned cylindrical legs (20) providing improved structural integrity to the assembled matrix of cells (10).

The horizontal linking members (32) include a main horizontal or lateral length (36) which can define the spacing laterally between joined modular cells. At each distal end (38a) and (38b) the horizontal linking member has tabs which are adapted to be inserted into the corresponding slot (40) or (42) of the pair of engagement points (22) and (24) on each cylindrical leg (20). The lateral length (36) of the horizontal linking members (32) may be approximately equivalent to the modular cell (10) width.

The horizontal linking member arrangement allows the modular cells (10) to be interconnected in a complete frame structure matrix. Columns or legs (20) become evenly spaced in all directions with no pre-alignment required i.e. establishment of the two engagement points substantially at right angles on each of the cylindrical legs (20) positioned at each of the edges of the support member (12) provide a means and mechanism in which the frame structure can be constructed vertically by mounting upper and lower modular cells together through the use of the cap (26) and then interconnecting evenly spaced modular cell laterally in all directions through the connector members (32).

The support member defines an opening (16) that offers a greater area in the top of the modular cell (10) to permit soil to be loaded more easily there through.

The larger openings shown by way of (18) between the respective cylindrical columnar legs (20) provides a larger space for both the tree root network and also service pipes to be able to pass there through.

Example 2

FIGS. 4 to 10 illustrate an alternative shape of cell and linking members used to form a matrix.

The cell generally indicated by arrow (50) includes a support member region (51) and legs (52). In this embodiment the horizontal mating sections (53) for horizontal linking members (56) are shaped as squares rather than as circles as in FIGS. 1 to 3.

Figure 5:
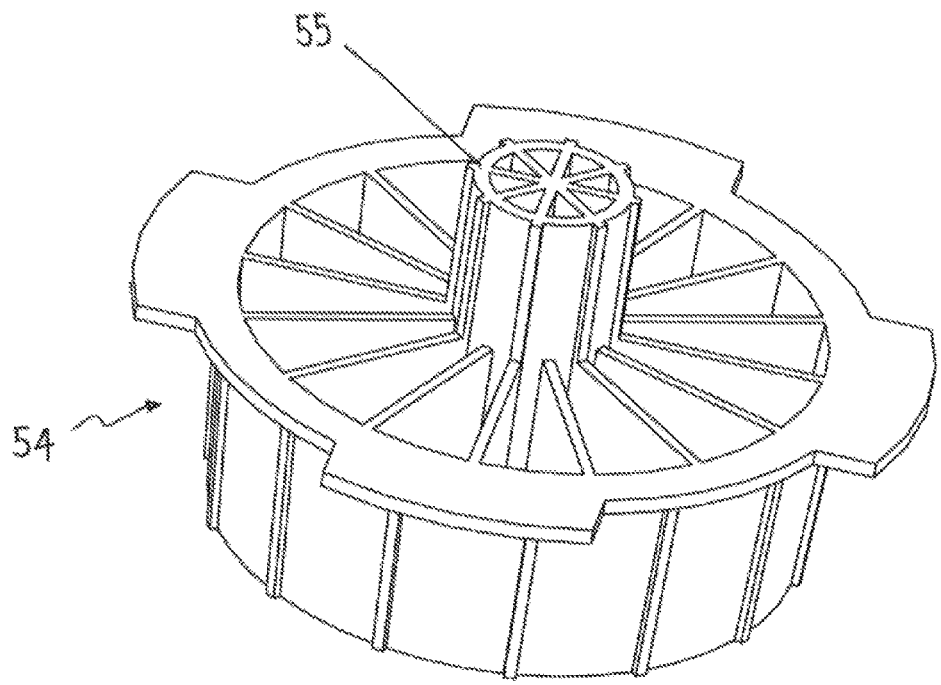
FIG. 5 illustrates a perspective view of a vertical linking member used with the cell of FIG. 4.

FIG. 5 shows a vertical linking member (54), again being a cap as in FIGS. 1-3 but with a slightly different shape including an upwardly extending protrusion (55). This protrusion (55) may mate with a complementary hole (not shown) in the base of a leg (52) of the cell (50).

Figure 6:
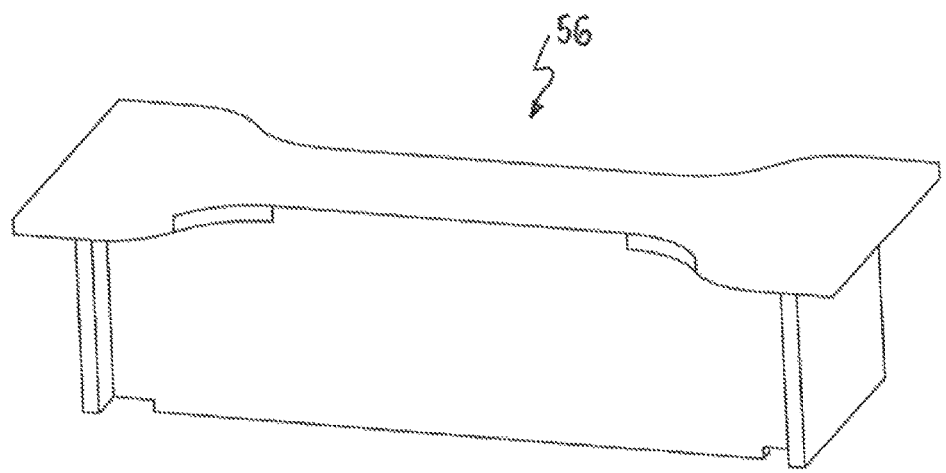
FIG. 6 illustrates a perspective view of a horizontal linking member used with the cell of FIG. 4.

FIG. 6 show a horizontal linking member (56) in this embodiment being an elongated rod with squared endings that mate with the horizontal mating sections (53) on the cell (50).

Figure 7:
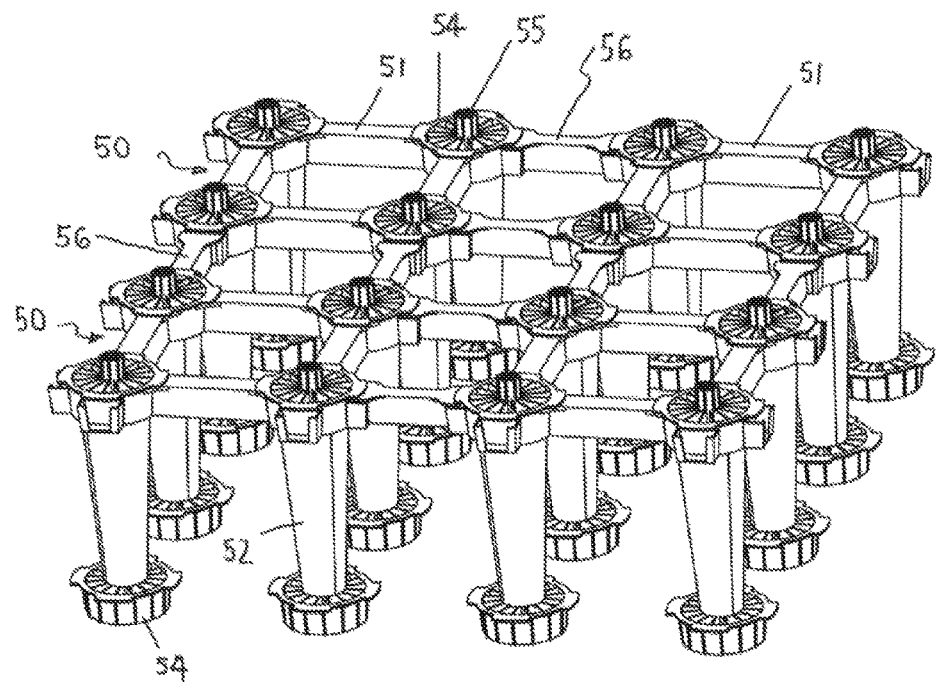
FIG. 7 illustrates a perspective view of a horizontal matrix of the cells of FIG. 4 linked together.

FIG. 7 shows a horizontal matrix of cells (50) linked together using the elongated rods (56). Caps (54) are shown inserted into the top of the legs (52). The bases of the legs (52) also include caps (54) with the protrusion (55) of each leg (52) inserted into a complementary hole (not shown) in the base of the leg (52). Using caps as part of the base may be useful in high loading situations but may not be required in lower loading applications.

Figure 8A:
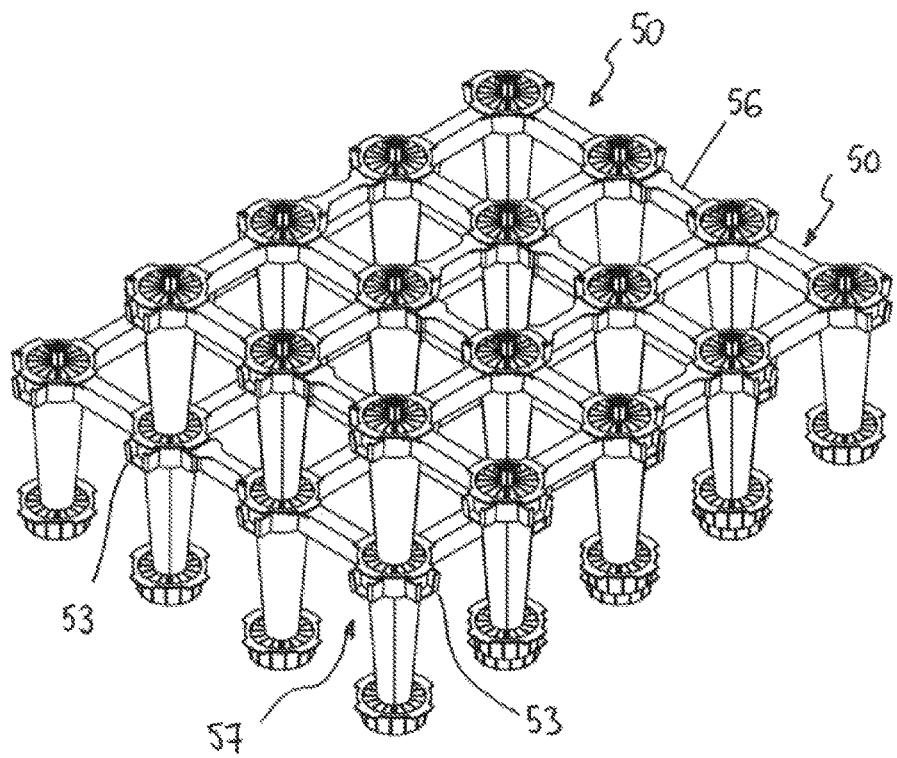
FIGS. 8a, 8b and 8c illustrate a perspective, plan and bottom view of a horizontal and vertical matrix of the cells of FIG. 4 linked together.
Figure 8B:
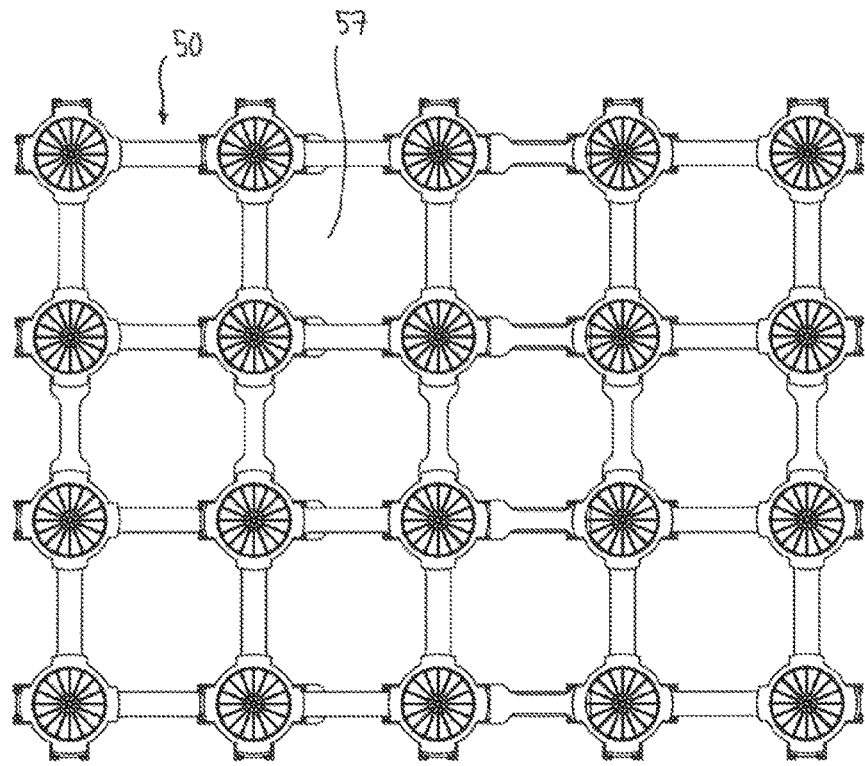
Figure 8C:
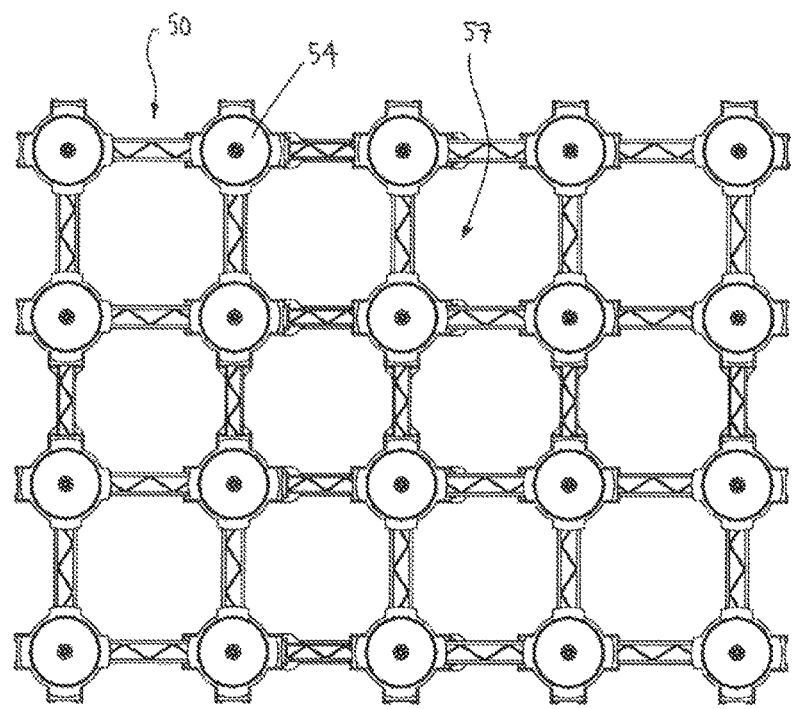

FIGS. 8a, 8b and 8c show a dual horizontal and vertical matrix of cells (50). As can be seen, the matrix includes distinct openings (57) vertically and horizontally through which soil and/or utility lines may pass.

Figure 9:
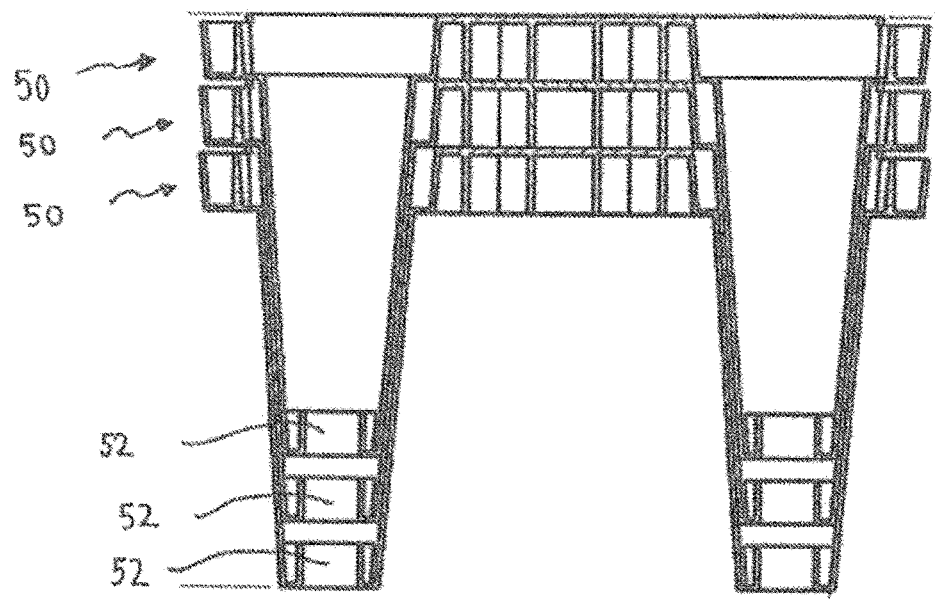
FIG. 9 illustrates a section side view of cells nested together for storage and transport.

FIG. 9 illustrates how the cells (50) may be nested together for ease of storage and transportation. Being able to nest multiple cells (50) together considerably reduces the volume thereby reducing transportation costs and making the cells easier to store.

Figure 10:
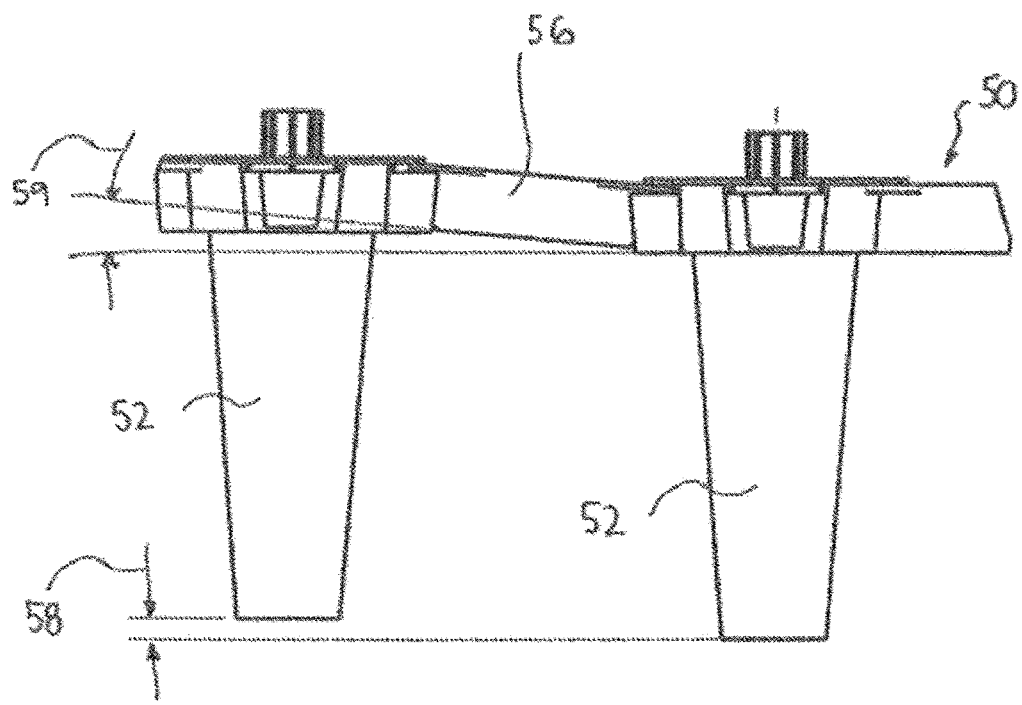
FIG. 10 illustrates a section side view of cells linked about an uneven surface illustrating how the matrix can cater for variation in ground surface contours.

FIG. 10 illustrates how the ground on which the cells are placed does not need to be completely flat and some variation in ground contour can be catered for. As shown in FIG. 10, the space between different cells (50) is spanned by a rod or rods (56). The rods may be on an angle (59) to a horizontal plane meaning the interconnecting cells (50) may be offset by distance (58).

Example 3

Figure 11:
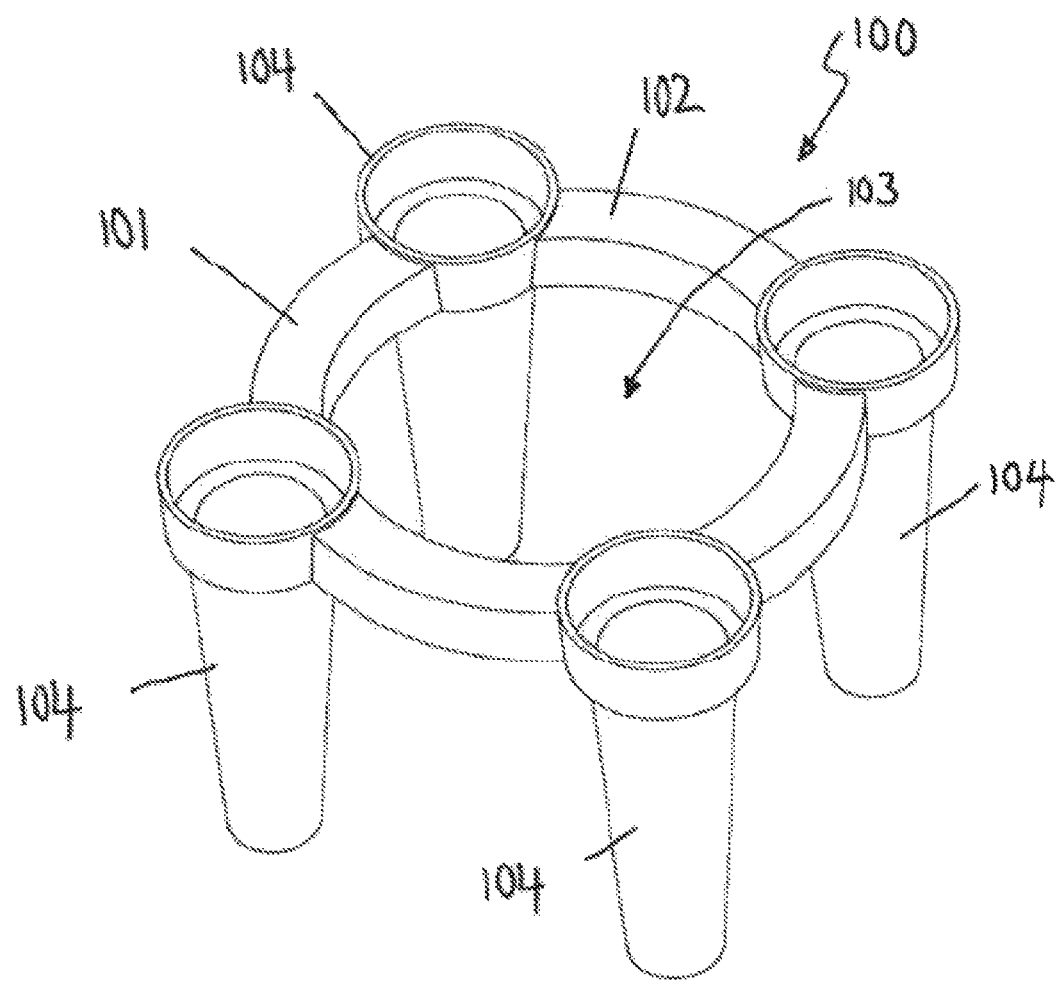
FIG. 11 illustrates an alternative circular shaped support member with mating sections and linking members not shown.

As noted above, the skirt shaped support member may be in varying shapes. FIGS. 1 to 10 illustrate a rectilinear polygon shaped skirt. FIG. 11 illustrates an alternative circular skirt shape general shown by arrow (100). As can be seen in FIG. 11, the support member (101) still includes similar features of a substantially planar surface (102) with an opening (103) and legs (104) extending from the support member (101).

Example 4

Figure 12:
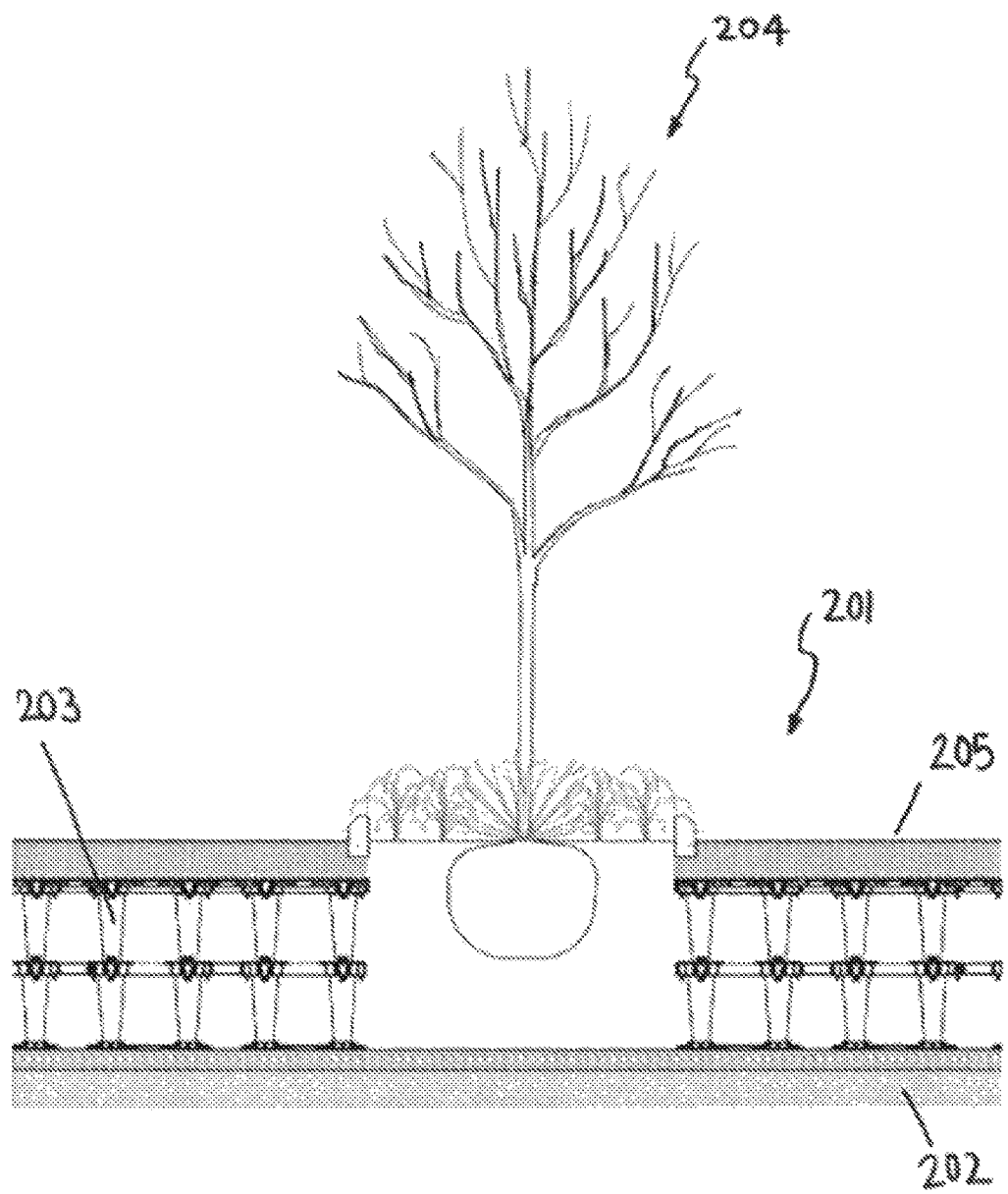
FIG. 12 illustrates a cross-section of a matrix in situ.
Figure 13:
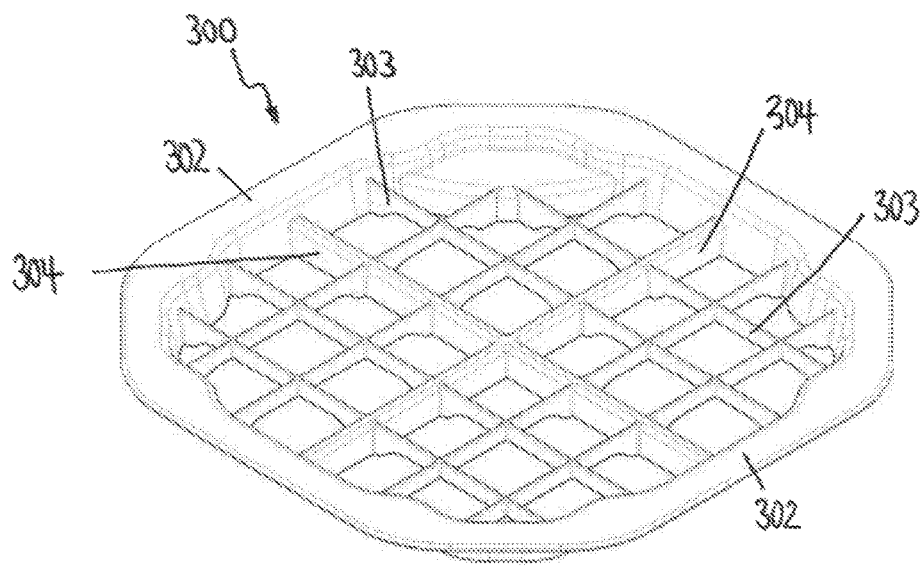
FIG. 13 illustrates a perspective view from above of a grating that may be used in a cell.
Figure 14:
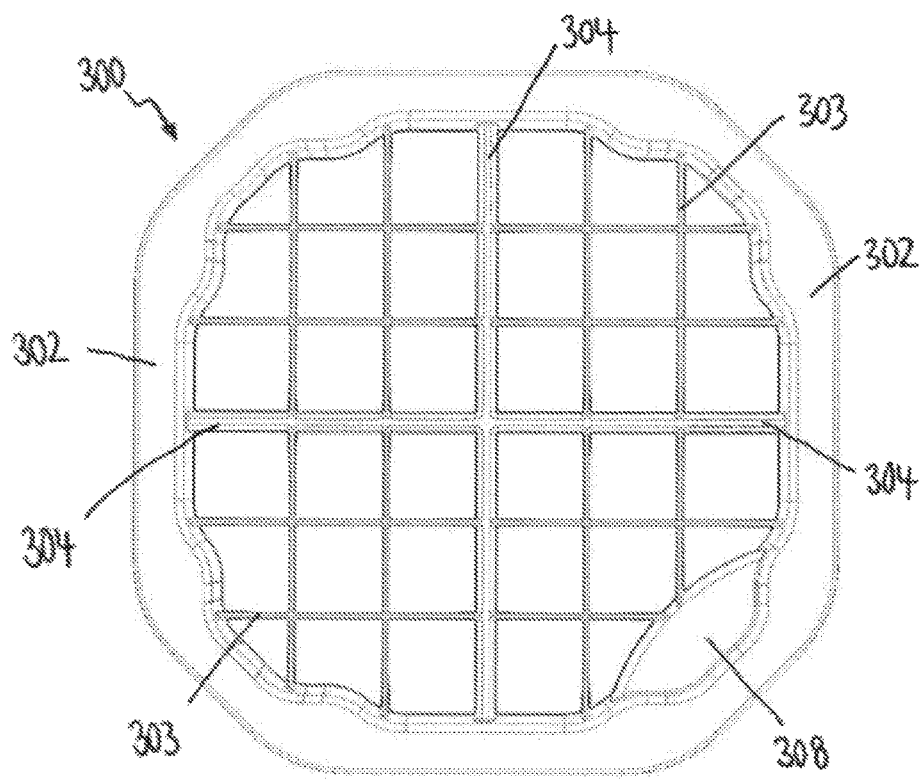
FIG. 14 illustrates a top view of a grating.
Figure 15:
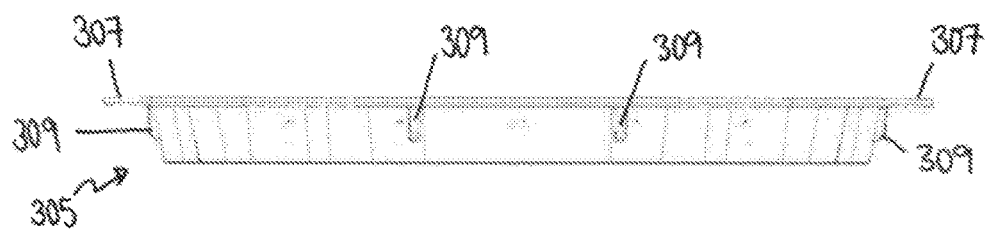
FIG. 15 illustrates a side view of a grating.
Figure 16:
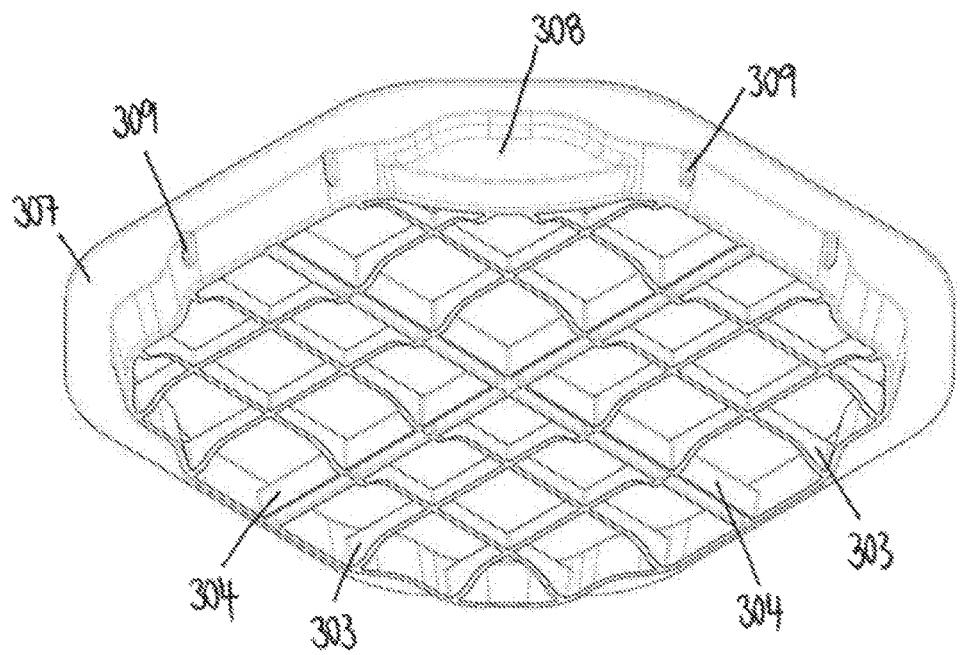
FIG. 16 illustrates a perspective view from below of a grating.
Figure 17:
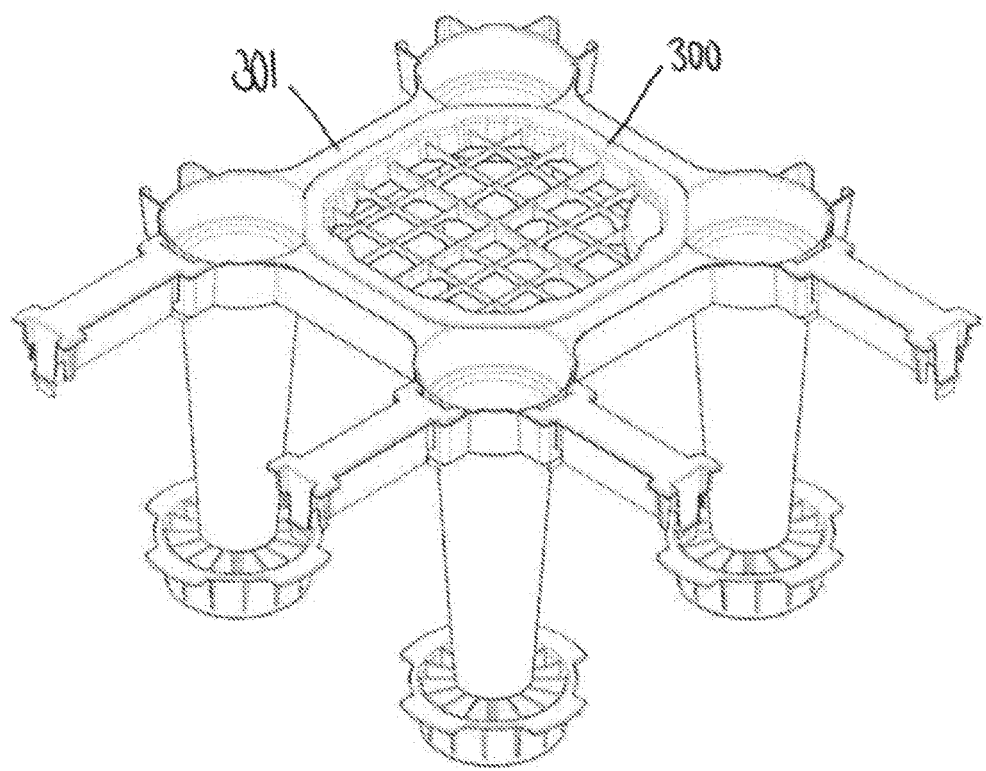
FIG. 17 illustrates a perspective view from above of a cell with a grating placed onto the top opening of the cell.
Figure 18:
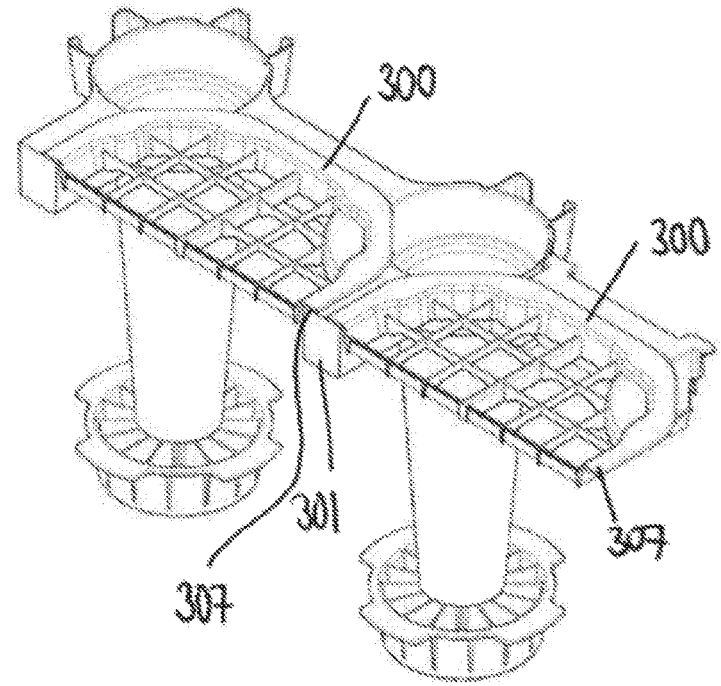
FIG. 18 illustrates a cross section perspective view of a cell incorporating a grating.

FIG. 12 illustrates an elevation cross-section view of a cell matrix installation. A pit generally indicated by arrow (201) is dug into compacted soil (202) surrounding the cell matrix (203) area. The cell matrix area is filled with soil (not shown) into which a tree (204) is planted. A load bearing feature (205) such as a footpath is laid over the cell matrix (203). The tree (204) is able to grow in the soil contained within the cell matrix (203). The cell matrix (203) supports the load bearing feature (205) and any load thereon such as pedestrians, vehicles and the like (not shown).

Example 5

FIGS. 13 to 19 illustrate a further variation in the design where gratings may be used. Gratings 300 may be helpful as a means to distribute a load force across the whole cell 301 or multiple cells 301 in a matrix 301A.

The grating 300 may be of a suitable size to engage the opening in the top of a cell 301. The grating 300 includes a solid border region generally indicated by arrow 302 with thinner members 303 inside the border region 302 defining a grating matrix. The thinner members 303 may include two thicker members 304 that define the central intersecting members and relatively thinner members surrounding these thicker members 304. The exterior of the grating border region 302 is an inverted L-shape generally indicated by arrow 305, the interior of the L-shape conforming to the shape of the cell 301 opening generally indicated by arrow 306. Part of the L-shape forms a lip 307 that prevents the grating from falling through the cell 301 opening.

The grating 300 may include an enlarged corner 308 so as to assist with handling the grating 300 when placing the grating 300 onto a cell 301 or when removing the grating 300 from a cell 301.

The walls of the L-shape interior 305 may include rib elements 309 to increase the strength and rigidity of the grating 300. The rib elements 309 may also assist with ensuring a snug fit of the grating 300 into the cell 301 opening and, via friction between the grating 300 rib elements 309 and cell 301, prevent the gratings 300 from accidentally disengaging the cell 301.

Figure 19:
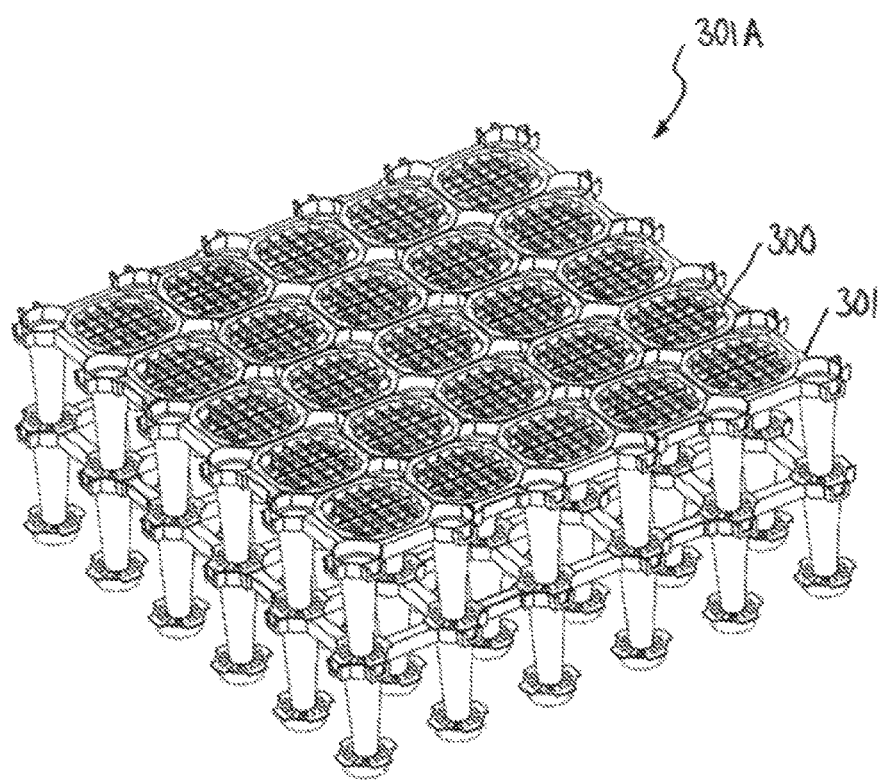
FIG. 19 illustrates a cell matrix with gratings placed on the top layer of cells.

As shown in FIG. 19, when gratings 300 are used, they may be placed on the top cell 301 layer only and lower layers do not have the gratings 300.

Example 6

Figure 20:
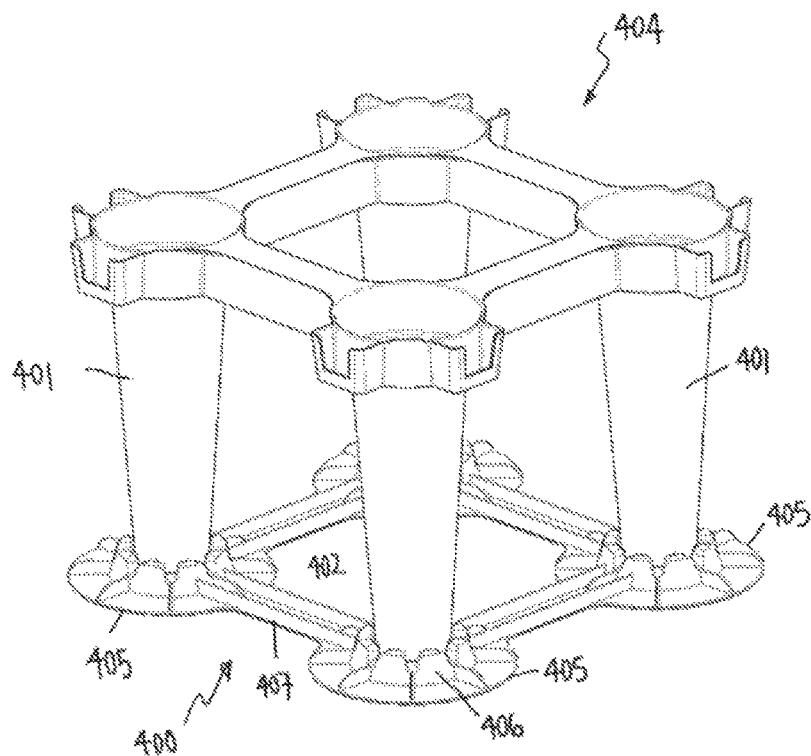
FIG. 20 illustrates a perspective view of a cell with a base member attached.
Figure 21:
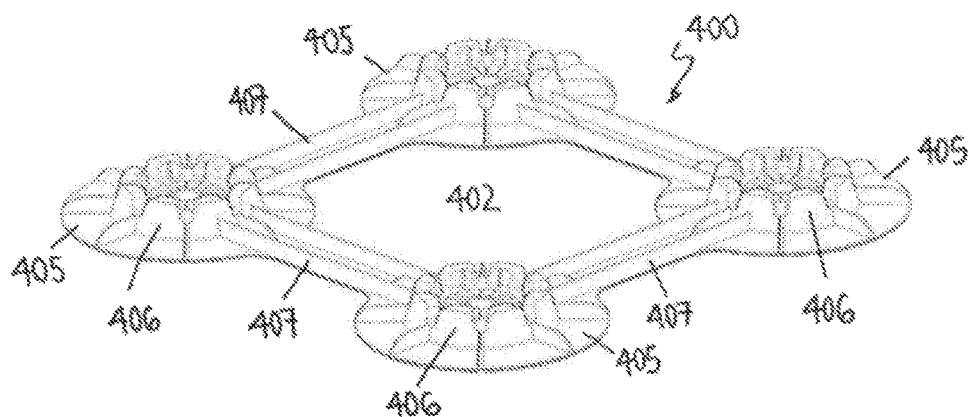
FIG. 21 illustrates a perspective view of one embodiment of a base member.
Figure 22:
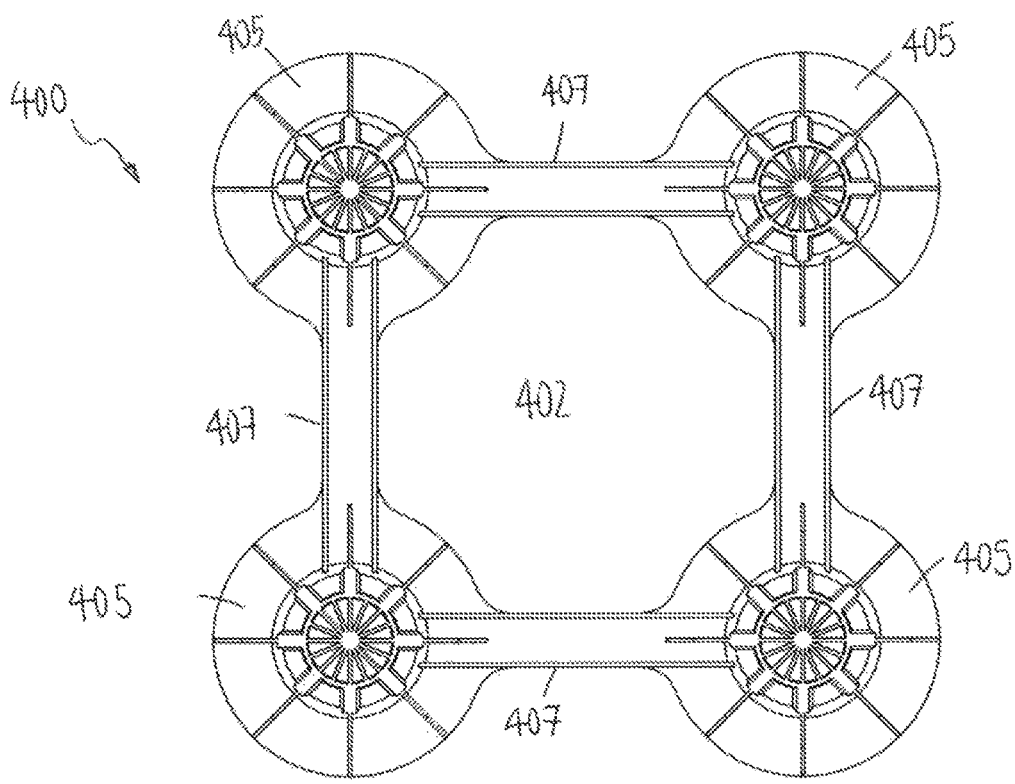
FIG. 22 illustrates a view from above of one embodiment of a base member.

FIGS. 20-22 illustrate one form of base 400 that may optionally be used. In the example shown, the base 400 is formed as a single piece skirt shaped member with a central opening 402. Each leg 401 of the cell 404 fits a complementary enlarged section 405 in the base 400. Multiple cells 404 may be used stacked on top or alongside the cell 404 shown in FIG. 20. For clarity, other cells in the matrix are not shown.

The legs 401 and base 400 enlarged sections 405 interlock or engage via the leg 401 endings 403 snugly fitting into receiving portions 406 on the base 400 in the manner of a male (leg 401) and female (receiving portion 406) fitting. Other means to link the parts (401,400) may be used but a simple snug fit is sufficient to spread the compressive downwards force on the leg 401 and retain the leg 401 and base 400 together.

The enlarged sections as shown are circular in shape. As illustrated, the enlarged sections 405 may have a diameter approximately three times larger than the diameter of the leg 401 ending 403—this particular ratio has been identified as a useful balance of strength, load distribution and minimisation of materials and parts. Each enlarged section 405 is linked using elongated rods 407 to form the base 400.

The base 400 may be formed as a single piece, placed onto a substrate (not shown) on which the cell 404 or cell matrix are to be built and the cell 404 then fitted to the base 400. The base 400 may be manufactured from plastic and moulded in the shape shown.

Aspects of the modular cell and matrix have been described by way of example only and it should be appreciated that modifications and additions may be made thereto without departing from the scope of the claims herein.

What is claimed is:

1. A structural matrix that supports a hardscape placed therein and which has a void space within to retain soil and/or water, the matrix formed by:
    a plurality of structural cells, each cell having a top and legs extending from the top, the cells arranged in a horizontal plane and releasably linked together by separate elongated linking members, the elongated linking members being a predetermined length thereby defining a distance of separation between the cells and a lateral space between the cells that forms a portion of the void space;
    the distance of separation is selected such that a distance between legs at two corners of one structural cell is substantially equal to a distance between legs at corners of two adjacent structural cells.

2. The matrix as claimed in claim 1 wherein the predetermined length of each elongated linking member is equivalent to between 20 to 150% of a cell width.

3. The matrix as claimed in claim 1 wherein each structural cell includes a horizontal mating section that releasably engages a first end of the elongated linking member and wherein an opposing second end of the elongated linking member engages a horizontal mating section of an adjacent structural cell thereby linking the cells horizontally.

4. The matrix as claimed in claim 3 wherein the first end and the second end of the elongated linking members terminate with tabs that complement and fit into the shape of at least one horizontal mating section of a structured cell.

5. The matrix as claimed in claim 4 wherein each at least one horizontal mating section has a socket shape that receives and fixably retains the tabs of the elongated linking members.

6. The matrix as claimed in claim 1 wherein each cell has at least two horizontal mating sections releasably engaging elongated linking members wherein the mating sections are located at two engagement points, configured at substantially right angles to each other.

7. The matrix as claimed in claim 1 wherein the top of each structural cell defines the horizontal plane, the top further including an opening therein.

8. The matrix as claimed in claim 7 wherein, the elongated linking members further define the horizontal plane.

9. The matrix as claimed in claim 7 wherein at least some of the elongated linking members are sloped with respect to the horizontal plane.

10. The matrix as claimed in claim 1 wherein the plurality of structural cells are linked together via the elongated linking members toolessly and without the need to use other fasteners.

11. The matrix as claimed in claim 1 wherein the compression strength of each structural cell is greater than at least 200 kPa.

12. The matrix as claimed in claim 11 wherein the compression strength of the matrix is greater than the compression strength of each structural cell.

13. The matrix as claimed in claim 1 wherein the void space is at least approximately 80% of the matrix.

14. The matrix as claimed in claim 1 wherein the legs of each structural cell are at least partially tapered to narrow as each leg extends from the top.

15. The matrix as claimed in claim 14 wherein each leg has a hollow portion thus allowing a plurality of cells to be nested during transport.

16. The matrix as claimed in claim 1 including a grating or gratings positioned in each cell.

17. The matrix as claimed in claim 1 including a plurality of base members adapted for placement between each cell and a substrate on which each cell is placed.

18. The matrix as claimed in claim 17 wherein each base member is formed as a single piece skirt shaped member with a central opening and wherein each leg of each cell links with an enlarged section of each base member.

19. The matrix as claimed in claim 1 wherein the predetermined length of each elongated linking member is equivalent to between 80 to 120% of a cell width.

20. The matrix as claimed in claim 1 wherein the predetermined length of each elongated linking member is equivalent to between 90 to 110% of a cell width.

21. The matrix as claimed in claim 1 wherein the predetermined length of each elongated member is equivalent to 100% of a cell width.

22. The matrix as claimed in claim 1 wherein the compression strength of each structural cell is greater than at least 300 kPa.

23. A structural matrix that supports a hardscape placed therein and which has a void space within to retain soil and/or water, the matrix formed by:
   a plurality of structural cells, each cell having a top and legs extending from the top, the cells arranged in a horizontal plane and releasably linked together by separate elongated linking members, the elongated linking members being a predetermined length thereby defining a distance of separation between the cells and a lateral space between the cells that forms a portion of the void space;
   a plurality of base members adapted for placement between each cell and a substrate on which each cell is placed;
   each base member is formed as a single piece skirt shaped member with a central opening and wherein each leg of each cell links with an enlarged section of each base member.

24. The matrix as claimed in claim 23 wherein the distance of separation is selected such that a distance between legs at two corners of one structural cell is substantially equal to a distance between legs at corners of two adjacent structural cells.

25. The matrix as claimed in claim 23 wherein the predetermined length of each elongated linking member is equivalent to between 20 to 150% of a cell width.

26. The matrix as claimed in claim 23 wherein each structural cell includes a horizontal mating section that releasably engages a first end of the elongated linking member and wherein an opposing second end of the elongated linking member engages a horizontal mating section of an adjacent structural cell thereby linking the cells horizontally.

27. The matrix as claimed in claim 26 wherein the first end and the second end of the elongated linking members terminate with tabs that complement and fit into the shape of at least one horizontal mating section of a structured cell.

28. The matrix as claimed in claim 27 wherein each at least one horizontal mating section has a socket shape that receives and fixably retains the tabs of the elongated linking members.

29. The matrix as claimed in claim 23 wherein each cell has at least two horizontal mating sections releasably engaging elongated linking members wherein the mating sections are located at two engagement points, configured at substantially right angles to each other.

30. The matrix as claimed in claim 23 wherein the top of each structural cell defines the horizontal plane, the top further including an opening therein.

31. The matrix as claimed in claim 30 wherein, the elongated linking members further define the horizontal plane.

32. The matrix as claimed in claim 30 wherein at least some of the elongated linking members are sloped with respect to the horizontal plane.

33. The matrix as claimed in claim 23 wherein the plurality of structural cells are linked together via the elongated linking members toolessly and without the need to use other fasteners.

34. The matrix as claimed in claim 23 wherein the compression strength of each structural cell is greater than at least 200 kPa.

35. The matrix as claimed in claim 34 wherein the compression strength of the matrix is greater than the compression strength of each structural cell.

36. The matrix as claimed in claim 23 wherein the void space is at least approximately 80% of the matrix.

37. The matrix as claimed in claim 23 wherein the legs of each structural cell are at least partially tapered to narrow as each leg extends from the top.

38. The matrix as claimed in claim 37 wherein each leg has a hollow portion thus allowing a plurality of cells to be nested during transport.

39. The matrix as claimed in claim 23 including a grating or gratings positioned in each cell.

* * * * *